March 15, 1966 C. L. DU VIVIER 3,241,105
TRAFFIC CONTROL SYSTEM
Filed Aug. 10, 1962 10 Sheets-Sheet 1

INVENTOR.
CHARLES L. DUVIVIER
BY
*Edward W. Eames*
ATTORNEY

TRAFFIC FLOW CHART OF
DOUBLE-ENTRY MODE OPERATION

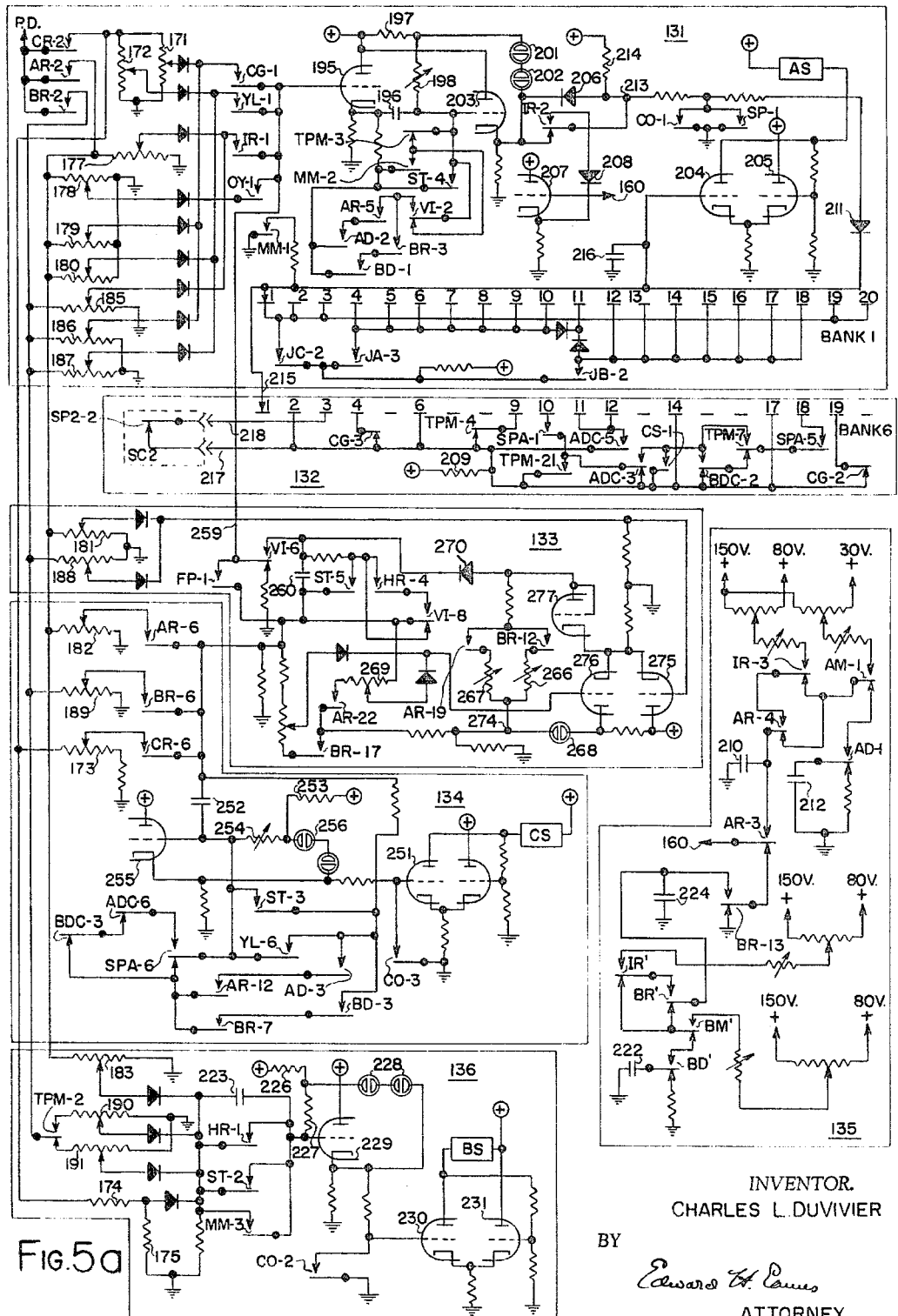

INVENTOR.
CHARLES L. DU VIVIER
BY
Edward H. Loomis
ATTORNEY

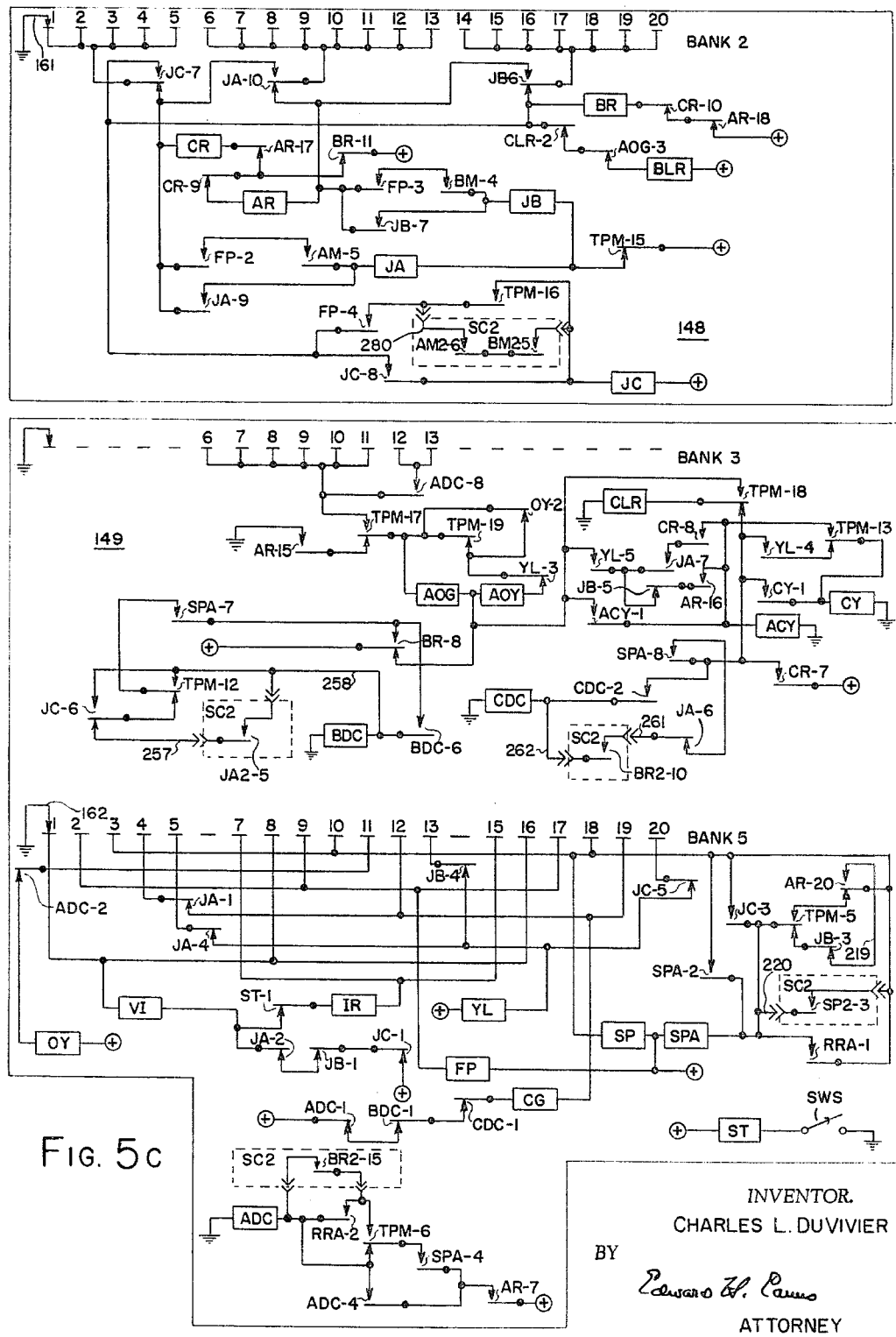

March 15, 1966    C. L. DU VIVIER    3,241,105
TRAFFIC CONTROL SYSTEM
Filed Aug. 10, 1962    10 Sheets-Sheet 8

INVENTOR.
CHARLES L. DuVIVIER
BY
Edward H. Eames
ATTORNEY

March 15, 1966 C. L. DU VIVIER 3,241,105
TRAFFIC CONTROL SYSTEM
Filed Aug. 10, 1962 10 Sheets-Sheet 10

INVENTOR.
CHARLES L. DUVIVIER
BY
ATTORNEY

United States Patent Office 3,241,105
Patented Mar. 15, 1966

3,241,105
TRAFFIC CONTROL SYSTEM
Charles L. Du Vivier, Darien, Conn., assignor to Laboratory for Electronics, Inc., Boston, Mass., a corporation of Delaware
Filed Aug. 10, 1962, Ser. No. 216,225
11 Claims. (Cl. 340—35)

This invention relates to a traffic control system or traffic signal controller. More particularly the invention relates to a system or composite traffic controller including two sub-controllers and a mode switching assembly for control of two closely spaced adjacent intersections along a common street, such as an artery, or intersections at opposite ends of a bridge, tunnel or overpass.

One particular application of the invention applies to the control of vehicle traffic at adjacent intersections each formed by the entrance and exit ramps from an expressway and each set of ramps intersecting with an artery crossing over or under the expressway so as to form a network of intersections commonly referred to as a "Diamond Interchange."

The present invention is an improved traffic controller or traffic control system which may be employed to control traffic at a heavily used diamond interchange where the area between the intersections, hereinafter referred to as the between-intersections area, is unable to absorb the vehicles of a normal traffic flow when the sequence of traffic signals at the adjacent intersections provide right-of-way to traffic flows so that vehicles are permitted to enter into the between-intersections area, and are held in the said area by the signal sequence not permitting continuity of traffic flow, thus not permitting exit therefrom, resulting in a "back-up" of vehicles which usually results in traffic congestion which may block both intersections and, at times back-up traffic on an exit ramp and on to the travelled portion of the expressway.

In the field of traffic control it is well known that the volume of traffic varies according to the time of day, the day of the week, the weather, and events of public interest, these factors generally combining so that traffic volumes will vary frequently and generally in varying degrees.

When the common roadway or artery itself, of a diamond interchange, is a spasmodically heavily travelled roadway and the exits from the expressway, forming part of the diamond interchange, are spasmodically heavily travelled, it has been found that during such high levels of traffic, special combined signal sequences which provide through-traffic-flows across the between-intersections area for traffic entering the area, provide efficient traffic movement into and out of the between-intersections area and prevent back-up and blockage of vehicle traffic in a most practical manner.

Theoretically, the ideal traffic movement would be to allow traffic into the between-intersections area and permit its continuance out of the area in an uninterrupted traffic flow. This type of traffic flow presents the problem of handling conflicting traffic flows, such as left turn traffic leaving the between-intersections area, left turn traffic entering the between-intersections area from the exit ramp from the expressway and straight-through traffic on the artery entering the area at the intersection at which the traffic is attempting to leave the between-intersections area.

The present invention provides a traffic controller which is substantially a composite controller including two interconnected and mutually coordinated sub-controllers and a mode selecting or switching assembly. Each of the respective sub-controllers transfers right-of-way among the several traffic flows at its respective intersection. Since, as previously described, the level or volume of traffic may vary and become relatively high or heavy at one time and relatively low or light at some other time, my present composite traffic controller may operate in one of two modes of operation, one mode which might be used when traffic is light or relatively low in volume and the second mode which may be used when traffic is considered heavy, or relatively high in volume.

DOUBLE-ENTRY AND SINGLE-ENTRY MODES

For convenience of description one mode of operation will be referred to as a double-entry mode and the other mode of operation will be referred to as a single-entry mode. Such terminology has significance in that the double-entry mode may provide major signal indications at the adjacent intersections permitting entry into the between-intersections area from both intersections at the same time; while the single-entry mode may provide major signal indications at the adjacent intersections permitting entry into the between-intersections area at only one intersection and provide a signal indication at the other intersection to permit exit of the entering traffic.

Each of the sub-controllers is interconnected in substantially symmetrical or alike circuitry such that certain of the relays of one sub-controller control certain circuitry of the other sub-controller, with the interconnected circuitry of each sub-controller being substantially symmetrical, or alike with one exception. To aid in maintaining coordination of action of the two sub-controllers for permitting the desired traffic movements at the closely spaced intersections and from one to the other intersection, one sub-controller is made subordinate to the other sub-controller, in some respects in unilateral circuitry, so that the subordinate sub-controller may be forced back into a condition of coordination in the event that the two sub-controllers temporarily get out of a coordinated condition.

Each sub-controller is also connected to, and symmetrically connected through circuitry of a mode switching assembly, for determining the mode of operation of the traffic controller.

Such mode switching assembly may be controlled by a switch, for example, which may be manually operated for selection of the operating mode of the controller, or the mode switching assembly may be operated automatically as by a time switch or time controlled mechanism, or may be automatically operated, in the preferred form, according to the relative value or level of traffic, as for example, the traffic volume or traffic density as determined by a traffic volume or traffic density computer which may select the mode of operation of the overall controller according to the traffic volume or traffic density or any other traffic characteristics or combination of characteristics.

If, for example, the mode switching assembly were automatically operated into double-entry mode and into single-entry mode by a traffic volume level responsive device, then such traffic volume level responsive device may cause the mode switching assembly to call for double-entry mode operation at substantially low traffic volume level and to call for single-entry mode operation at and above a somewhat higher traffic volume level, for example, with the traffic levels selected as desired.

When operating in double-entry mode, certain signal sequence indications, or transfers of right-of-way between traffic flows by one sub-controller may be made only in conjunction with the other sub-controller, so that transfer of right-of-way at the respective intersections is made on a predetermined sequency while the individual sub-controller individually responds to the demands of traffic immediately at the intersection controlled by the particular sub-controller. Other signal sequence indications or transfers of right-of-way may be made by one sub-controller substantially independently of the other sub-controller.

In double-entry mode operation it may be said that each sub-controller operates substantially as a two-phase full actuated controller, with certain limitations for coordination purposes, as previously referred to. Further, interlinking between the two sub-controllers may also provide for selection by one sub-controller of one time period between two separately adjusted time periods for the same interval, as for example, a regular time of a certain interval and an alternate time of the same interval, according to the mode operation of the composite controller according to predetermined conditions of both sub-controllers.

For example, it may be desired to have a longer than normal initial interval timed by one sub-controller for artery traffic leaving the between-intersections area at one intersection when the other sub-controller is timing its initial interval for traffic entering into the between-intersections area. A longer or extended initial interval timed by the sub-controller permitting exit of traffic from the between-intersections area may be preferred, to allow more time for the vehicles entering the area to reach the vehicle detector of the sub-controller permitting exit of the entering traffic for purposes of extending the time extendible, vehicle interval which normally follows the normally non-extendible initial interval. Selection of a longer than normal initial interval may provide continuity of flow of traffic into and out of the between-intersections area in a more efficient manner by providing more time for vehicles to reach the vehicle detector thereby permitting a greater degree of control of the sub-controller by vehicle traffic.

Within the scope of the present invention, the three principal artery traffic flows at each intersection are individually controlled by an individual set of green, yellow and red signals respectively. Within each sub-controller, as will be seen in the accompanying drawings, are individual signal circuits for each set of signals controlling each of the three principal artery traffic flows. As may be seen in the drawings, the three artery traffic flows or movement referred to are:

(1) The straight traffic movement through the intersection commencing from the between-intersections area and terminating on the far side of the intersection from the between-intersection area;

(2) The straight traffic movement through the intersection commencing on the far side of the intersection heading toward and terminating in the between-intersections area; and (3) the left turn movement from inside the between-intersections area to one of the entrance ramps or cross-streets at the intersection.

Artery movement number 1 will be assumed to be controlled by "inside" signals, such as inside red, inside yellow and inside green due to the fact that these signals are displayed to the "inside" traffic, i.e. "inside" referring to the between-intersections area. Artery movement number 2 will be assumed to be controlled by "outside" signals, such as outside red, outside yellow and outside green due to the fact that these signals are displayed to the "outside" traffic, i.e. "outside" referring to the roadway on the opposite side of the intersection from the between-intersections area. Artery movement number 3 will be assumed to be controlled by "left turn" signals, such as left turn red, left turn yellow and left turn green since these last signals are displayed to traffic wishing to make a left turn from the between-intersections area.

Provision is made, as seen in the circuit diagram, for selection between two green left turn signals according to the mode in which the composite controller is operating. One signal may be in the form of the usual green ball permitting unrestricted flow, while the other green signal may be in the form of a green arrow indicating right-of-way to left turn traffic only.

Since the sub-controllers are substantially symmetrical similarly positioned signals are controlled by symmetrical circuitry in each sub-controller.

Although both sub-controllers employ substantially symmetrical circuitry, except for the coordination maintenance circuitry as mentioned above, and both sub-controllers are inter-connected with mutual coordination, both sub-controllers may, at times, operate substantially independently of each other while in double-entry mode operation, except to a limited extent to facilitate the orderly flow of vehicles into and out of the area between the intersections.

It is anticipated that double-entry mode operation will serve relatively light traffic flows so that strict adherence to mutual coordination at all times becomes unnecessary. Thus, in double-entry mode operation I have provided a composite traffic controller in which the interconnected sub-controllers exert mutual coordination between each other part of the time, and only when orderly flow of traffic vehicles requires such coordination, and at all other times permits each sub-controller to be and operate substantially independent of the other.

It should be pointed out that the cross street or exit ramp traffic movement substantially includes right turn and left turn traffic since, at a diamond interchange it is substantially only because of some error that the driver of a vehicle would exit from the expressway and immediately re-enter, proceeding in the same direction. Further, if the adjacent intersections are of ramps or cross-streets at a common main artery and the cross-streets were each one way in opposite directions as in the case of an exit ramp on one side of the artery and an entrance ramp on the other, the prevailing traffic from the cross-streets or ramps may be right turn and left turn traffic. Of course, any cross traffic which may make a right turn, that is, away from the between-intersections area, or may proceed straight on such cross street would not enter into the between-intersections area and would not become part of the traffic that must be moved out of such area by the sub-controller controlling traffic at the adjacent intersection.

The interconnections between the sub-controllers and the connections between each sub-controller and the mode switching assembly provide for orderly transition of the composite controller from double-entry mode operation to single-entry mode operation which a change in mode of operation is made.

It is anticipated that the present traffic control will operate in single-entry mode operation when traffic at the adjacent intersections becomes somewhat above what may be considered light traffic conditions at the interchange controlled by the subject controller. It will be appreciated that due to physical differences among different diamond interchanges such as differences in distance between adjacent intersections and differences in the widths of the roadways making up a diamond interchange, for example, one diamond interchange may have characteristics different from another and the value of traffic characteristic at which the mode of operations should change from double-entry to single-entry mode or from single-entry to double-entry mode, depends upon the particular characteristics of the traffic flows at the particular diamond interchange and to set an arbitrary or exemplary traffic value at which a change in mode of operation should be made, in either direction, would be superfluous.

Thus, at some desired value, as best determined from the characteristics of the traffic flows at the adjacent intersections, the mode switching assembly may cause a change in mode of operation from double-entry mode to single-entry mode operation, for example.

COMPARISONS BETWEEN DOUBLE-ENTRY MODE AND SINGLE-ENTRY MODE

Single-entry mode operation differs from double-entry mode operation in that there is a more positive association between the traffic flows at the intersections on either side of the between-intersections area. This is visually indicated by the traffic flow charts, which are part of the drawings and show what may be referred to as the combinations of major traffic flows at the intersections.

The more positive association between the traffic flows at the adjacent intersections is maintained by a close coordination between the two sub-controllers in the single-entry mode.

As will be seen in the charts showing the traffic flow movements, double-entry mode operation includes a conflict of traffic movements on the artery traffic flows, that is, movement #2 and movement #3 are conflicting movements that are given right-of-way at the same time. This conflict may be tolerated due to the low traffic volumes usually associated with this mode of operation. Under certain conditions movement #2 is held and movement #1 and #3 are permitted to continue, which provides delayed or lagging green left turn and through exit movements.

Single-entry mode operation eliminates this conflict of movements by withdrawing right-of-way from movement #3 when movement #2 has right-of-way. Of course, when right-of-way is given to the cross street or ramp traffic, right-of-way is withdrawn from both movement #2 and movement #3 as well as movement #1.

Elimination of conflicting movements is part of the change in mode of operation as well as providing less unilateral freedom of the individual sub-controllers. In lieu of the unilateral freedom enjoyed by the individual sub-controllers in double-entry mode operation, a relationship between the signal display at the adjacent intersections is maintained so that almost constant reciprocal control is maintained in the sense that one of the two sub-controllers determines when the combined signal display may change into another signal display with such determination reciprocal according to the signal displayed by the sub-controller.

Limited unilateral change of signal display is permitted when traffic conditions indicate this is desirable, so that one sub-controller may change from one certain signal indication to another without the other sub-controller being forced into a change of signal display. Such limited unilateral change is reciprocal between the sub-controllers for similar signal displays.

Since, as previously stated, it is anticipated that single-entry mode operation of the present composite traffic controller will be in effect for relatively heavy traffic at the adjacent intersections the objective of such single-entry mode operation is to maintain a free and orderly flow of traffic through the area between the intersections and avoid back-up or blockage of traffic in the between-intersections area. In order to maintain such free and orderly flow, a combination of signal indications displayed at the adjacent intersections is provided so that when vehicle traffic is permitted to enter into the between-intersections area such vehicles are either permitted to continue through and out of the area without stopping or such vehicles are, at the first opportunity, permitted to exit from the area before the area may become congested due to display of another traffic movement permitting traffic to enter the between-intersections area.

Thus as indicated by the drawings in which the traffic flow combinations are displayed, specific signal combinations providing such traffic movements are displayed at the adjacent intersections so that a traffic movement for clearing the between-intersections area is combined with a traffic movement permitting entrance into the area or two traffic movements for clearing the area are combined at each intersection thereby providing continuity of traffic flow into and continuing out of the between-intersections area.

In the interconnecting circuitry between the two sub-controllers and the interconnecting circuitry between the individual sub-controller and the mode switching assembly, control by one sub-controller over the cyclic operation of the other sub-controller, provides the desired signal display combinations at the adjacent intersection during the cyclic operations of both sub-controllers, with such control reciprocal under similar circumstances.

Control over the cyclic advance of one sub-controller depends upon the "call" or "calls" of traffic actuation in both sub-controllers and the cyclic position of both sub-controllers and the mode of operation in which the composite traffic controller is operating.

When operating in single-entry mode, it may be said that each sub-controller operates as a three-phase actuated controller, two phases of which are responsive to traffic actuation at the intersection whose traffic signals are directly controlled by that sub-controller, with the third phase responsive to actuation by the other sub-controller.

OBJECTS OF INVENTION

It is a general object of the invention to provide an improved traffic control system or controller for closely spaced roadway intersections having widely varying traffic demands and a considerable proportion of traffic turning movements.

It is a further object of the invention to provide an improved traffic control system or controller for the diamond interchange of expressway ramps or service roads connecting with or intersecting a major road.

It is also an object of the invention to provide an improved traffic control system or controller having two modes of operation and means for changing smoothly between the two modes.

It is also an object of the invention to provide an improved traffic control system or controller for two closely spaced roadway intersections and including two traffic-actuated sub-controller units, one individual to each intersection, and means interlinking the sub-controller units to permit such units a high degree of freedom in responding to traffic actuation from traffic in the associated intersecting roadways at the individual intersections to accord right-of-way in response to relative traffic demands while maintaining limited restrictions on transfer of right-of-way among the intersecting traffic movements by one sub-controller at one intersection with reference to the other sub-controller at the other intersection, and said system or controller having two different operating modes for the relations of traffic movements permitted concurrently at the two intersections, and including mode selecting means for changing between the respective modes and making one or the other mode effective.

It is a further object of the invention to provide a traffic control system or controller of the type described in the immediately preceding object and in which the selection of mode is made in accordance with measurement of a characteristic of traffic flow.

It is also a further object of the invention to provide a traffic control system as in the last preceding object and in which the mode selection is made in response to either one source of traffic measurement or to both of two sources of traffic measurement in relation to one or more pre-adjustable levels of such measurement.

Other objects will become obvious from the following description read in conjunction with the drawings in which:

Figure 5B:
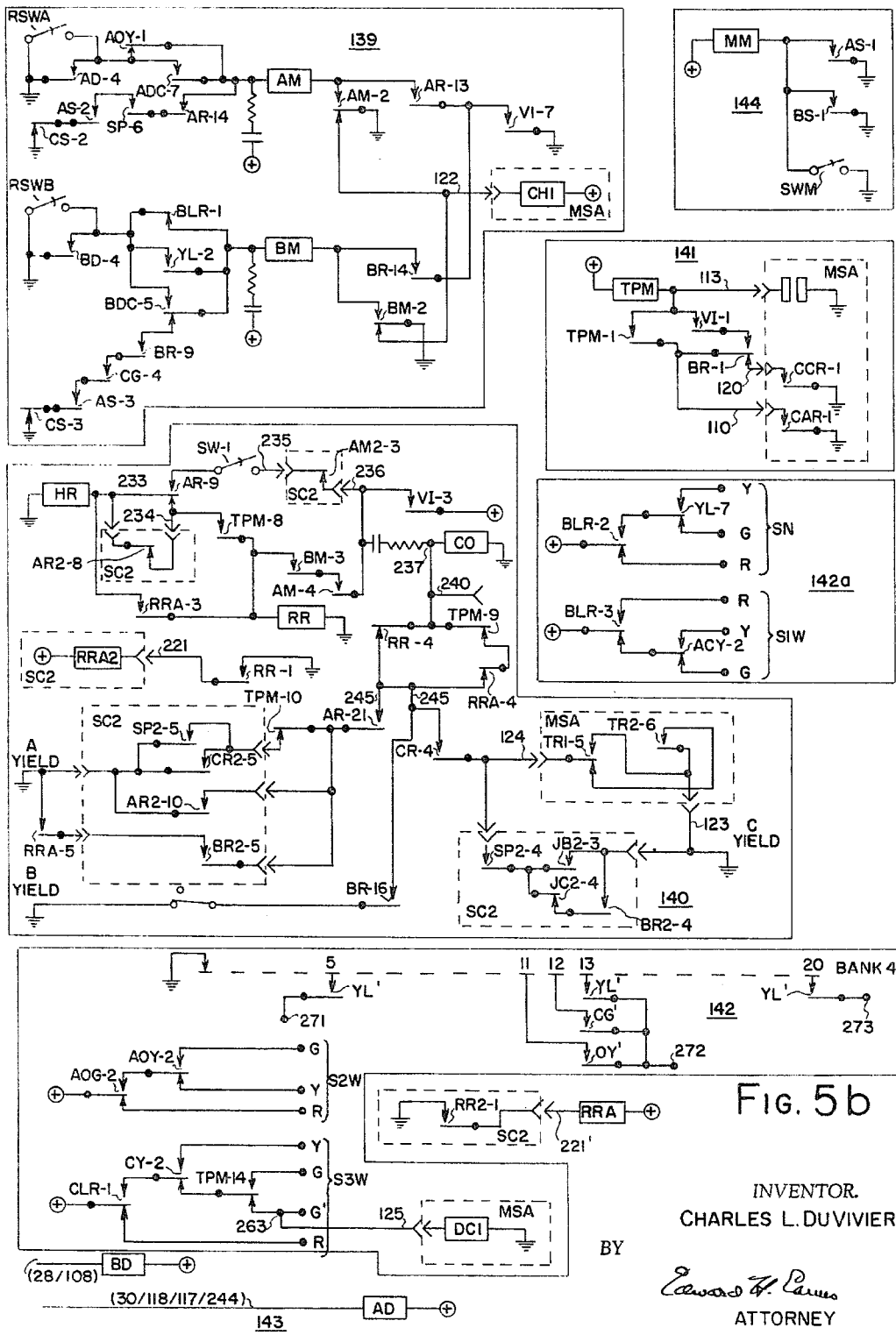
Figure 6A:
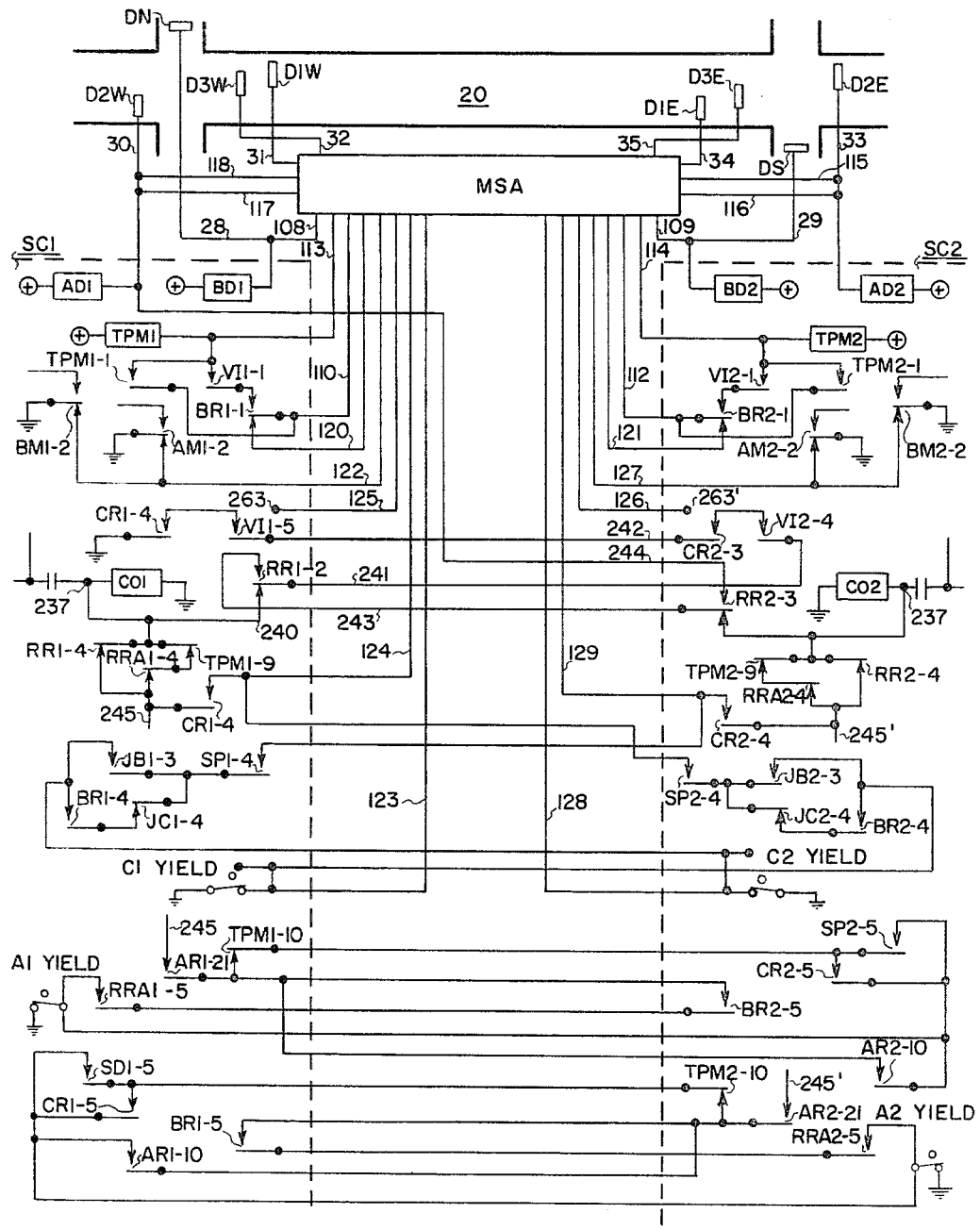
Figure 6B:
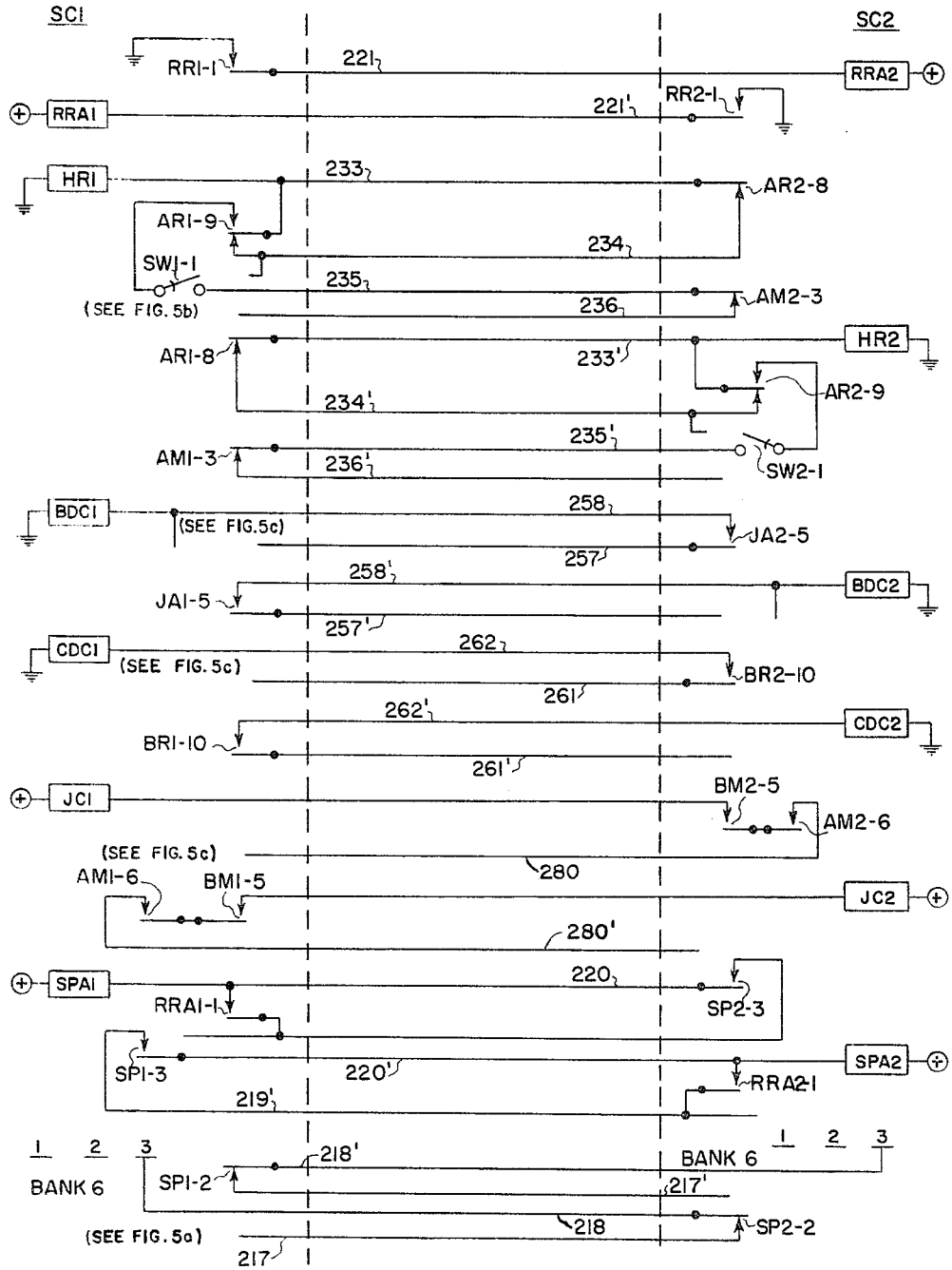
Figure 7:
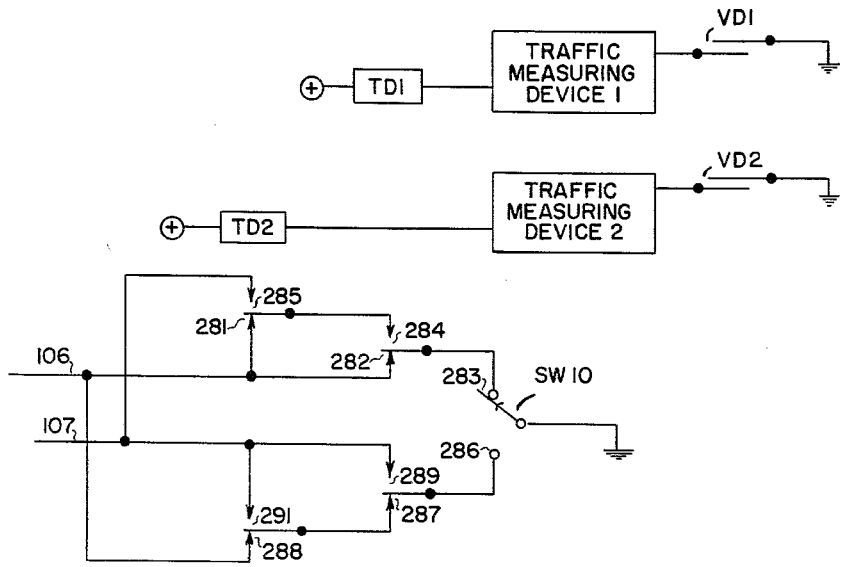
Figure 8:
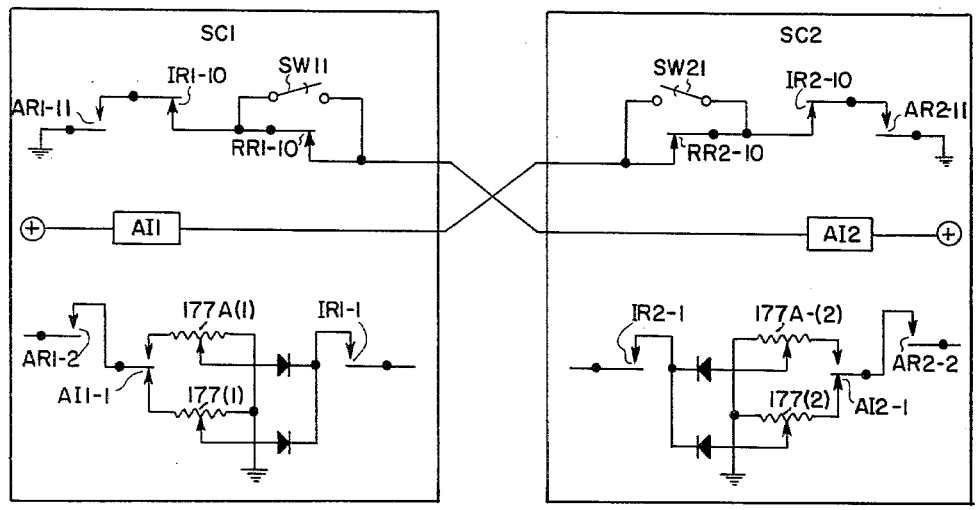

FIG. 5, including FIGS. 5a, 5b and 5c in combination, is a circuit diagram of the preferred form of sub-controller;

FIG. 6, including FIGS. 6a and 6b, is in circuit diagram form and shows part of the interconnected circuitry between the two sub-controllers;

FIG. 7 illustrates partly in block and partly in circuit form, one form of mode selection apparatus which may select the mode of operation to which the mode switching assembly may switch; and FIG. 8 shows optional circuitry that may be employed in the sub-controllers, if desired to select between two different basic time periods for the initial interval, of one sub-controller according to the condition of the other sub-controller.

GENERAL LAYOUT OF SYSTEM AT DIAMOND INTERCHANGE—FIG. 1

Figure 1:
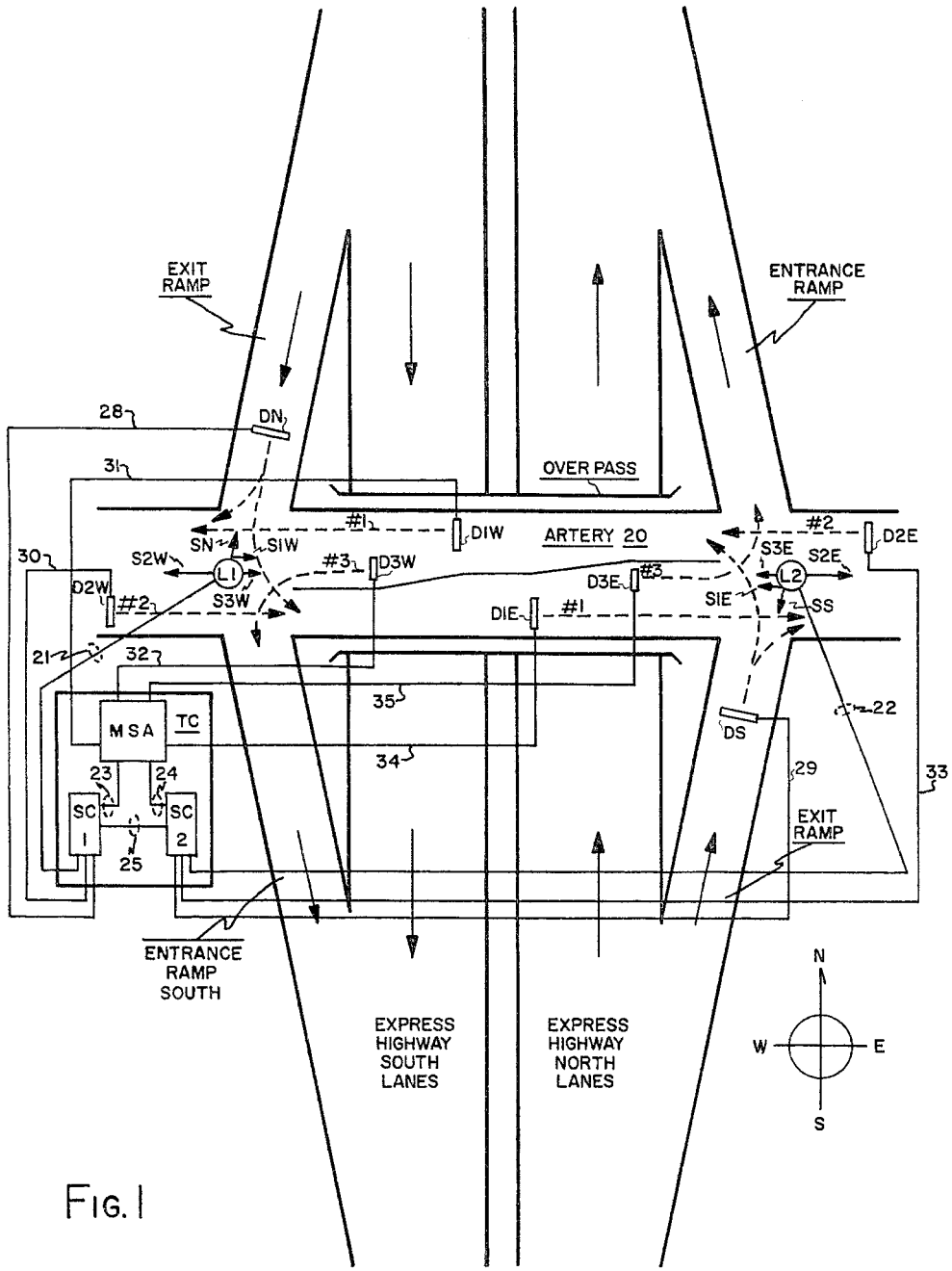
FIG. 1 shows a plan view of a diamond interchange with the traffic flow patterns indicated and the composite controller connected so as to be operable in response to traffic at the interchange with the signals at the intersections of the interchange controlled by the composite controller.

Referring to FIG. 1 a plan view of a diamond interchange, including an expressway serving northbound traffic in the right hand lanes and serving southbound traffic in the left hand lanes and an exit ramp and entrance ramp for each traffic direction respectively, is shown with the exit ramps and entrance ramps leading to and from a main street or artery 20 which forms an overpass, over the expressway lanes.

For convenience of description and without limitation, a compass rose is shown in the drawing and the express highway is assumed to be laid-out in a north-south direction.

The solid-line arrows on the expressway lanes and the ramps indicate the direction of the vehicle traffic flow but it will be understood that the artery 20 enjoys two-way traffic, and in this example, is assumed to be eastbound and westbound vehicle traffic.

In the section to the lower left of the west intersection is block TC. This block includes within it a smaller block MSA and two other smaller blocks SC1 and SC2. The large block TC represents the composite traffic controller of the present invention. The block MSA represents part of the traffic controller, the mode switching assembly, while the block SC1 represents sub-controller #1 which controls the signals collectively represented by L1 in the west intersection of the diamond interchange via multiple leads represented by bracketed line 21 and block SC2 represents sub-controller #2 which controls the signals collectively represented by L2 in the east intersection of the diamond interchange via multiple leads represented by bracketed line 22.

Figure 4:
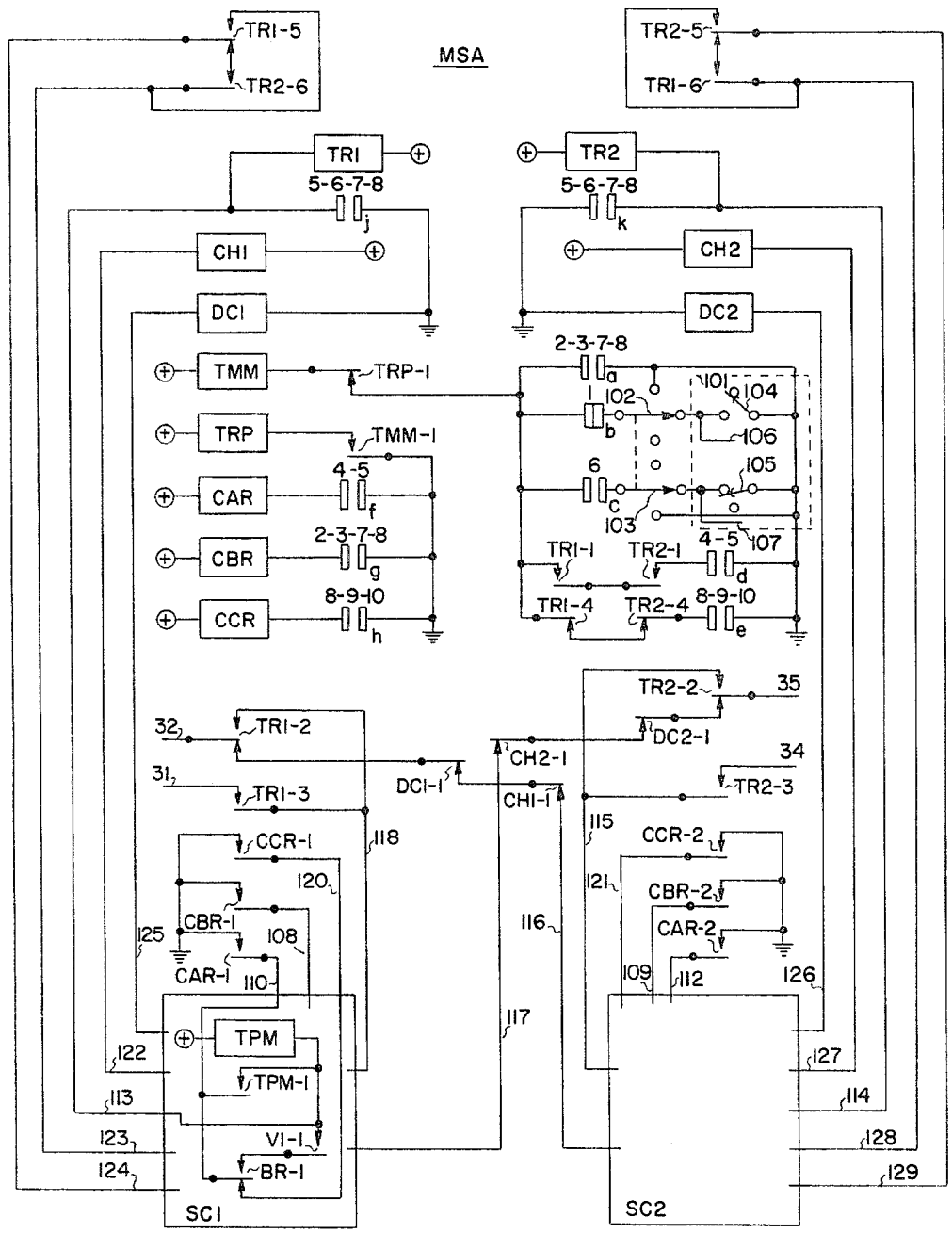
FIG. 4 is a circuit diagram of one form of mode switching assembly.

FIG. 4 illustrates the circuitry which may be included in block MSA and also shows the interconnecting circuitry between the mode switching assembly and the sub-controllers #1 and #2, which interconnnecting circuitry is collectively represented by bracketed lines 23 and 24 respectively. The circuitry which may be included in block SC1 or SC2 is illustrated in the combined FIGS. 5a, 5b and 5c while the interconnecting circuitry between the sub-controllers, collectively represented by the bracketed line 25 is illustrated in more complete form in FIGS. 6a and 6b.

Reference was previously made to the traffic flows or movements along the artery at the intersections and such traffic flows are indicated by arrows in broken line form and labeled #1 for straight traffic existing from the area between the intersections, #2 for straight traffic entering the between intersections area, and #3 for left turn traffic from the between intersections area of the artery to the entrance ramp of the expressway.

Since the description of each of the three artery traffic flows adequately describes a traffic flow at each of the two intersections, identical numbers are given to the traffic flows fitting the particular description; however, it will be noticed that where in the west or left intersection, #1 traffic movement is westbound, in the east or right intersection #1 traffic movement is eastbound. Of course, the directions of the corresponding traffic movement at the opposite intersections are also reversed, since the traffic flows are at opposite intersections. As to signal lights L1, a set of green, yellow and red signals, the outside signals, are represented by S2W are for control of the traffic flow #2 at the west intersection and the set of green, yellow and red signals, the left turn signals, are represented by S3W are for control of the traffic flow #3 at the west intersection. As will be seen in the circuit diagram of block SC1 each set of signals S1W, S2W and S3W are individually controlled by individual signal circuits. The arrow SN of signals L1 represents a set of green, yellow and red signals displayed to traffic on the exit ramp entering the west intersection from the north.

The signal lights L2, at the east intersection include a set of green, yellow and red signals, inside signals, represented by S1E for control of the #1 traffic flow at the east intersection while S2E represents a set of green, yellow and red signals, the outside signals for control of the #2 traffic flow at the east intersection and S3E represents a set of green, yellow and red signals, the left turn signals for control of the #3 traffic flow at the east intersection. The arrow SS of signals L2 represents a set of green, yellow and red signals displayed to traffic on the exit ramp entering the east intersection from the south.

DN represents a vehicle detector in the west or left side exit ramp positioned to be actuated by vehicles approaching the west intersection from the north and DS represents a vehicle detector in the east or right side exit ramp positioned to be actuated by vehicles approaching the east intersection from the south. The detectors DN and DS are respectively connected to the sub-controllers SC1 and SC2 respectively via leads 28 and 29 respectively.

D1W and D2W each represent a vehicle detector respectively located in the pathway of vehicles following the #1 traffic flow or movement and the #2 traffic flow or movement respectively on the artery at the west intersection. Detector D2W is connected, via lead 30 to the sub-controller SC1 while detector D-W is connected via lead 31 to the mode switching assembly. As more fully described below the mode switching assembly connects detector D-W to the sub-controller SC1 during double-entry mode operation but electrically disconnects the detector from the sub-controller, during single-entry mode operation so that the detector D1W seerves for vehicle detection during double-entry mode operation only.

D3W represents a vehicle detector an is located in the pathway of vehicles following the #3 traffic flow on the artery at the west intersection. Detector D3W is connected to the mode switching assembly via lead 32 and, as more fully described below, the mode switching assembly serves to effectively switch the detector D3W between the sub-controllers according to the mode of operation in which the composite traffic controller is then operating. When operating in double-entry mode the detector D3W is connected via the mode switching assembly to sub-controller SC1 in parallel with detectors D1W and D2W. When operating in single-entry mode the detector D3W is connected to sub-controller SC2 and serves as a "call" detector only, associated with detector D2E.

D1E and D2E each represent a vehicle detector respectively located in the pathway of vehicles following the #1 traffic flow and the #2 traffic flow respectively on the artery at the east intersection. Detector D2E is connected via lead 33 to the sub-controller SC2 while detector D1E is connected via lead 34 to the mode switching assembly.

As more fully described below the mode switching assembly connects detector D1E to sub-controller SC2 in parallel with detector D2E, during double-entry mode operation but electrically disconnects the detector from the sub-controller during single-entry mode operation so that detector D1E serves for vehicle detection during double-entry mode operation only.

D3E represents a vehicle detector and is located in the pathway of vehicles following the #3 traffic flow on the artery at the east intersection. Detector D3E is connected to the mode switching assembly via lead 35, and, as more fully described below the mode switching assembly serves to effectively switch the detector D3E between the sub-controllers according to the mode of operation in which the traffic controller is then operating. When operating in double-entry mode, the detector D3E is connected, via the mode switching assembly in parallel with detectors D1E and D2E, to sub-controller SC2. When operating in single-entry mode the detector D3E is connected to sub-controller SC1 and serves as a "call" detector only, associated with detector D1E.

The several vehicle detectors may be any of the well known type, either mechanical, electrical or electronic, which close a normally open set of contacts upon actuation. Such detectors may be sensitive to pressure, magnetism, radiant energy or light. Obviously each representation of a vehicle detector herein may individually represent one or more detectors and if any one representation represents two or more detectors such two or more detectors may be connected in parallel.

DOUBLE-ENTRY MODE—FIG. 2

Figure 2:
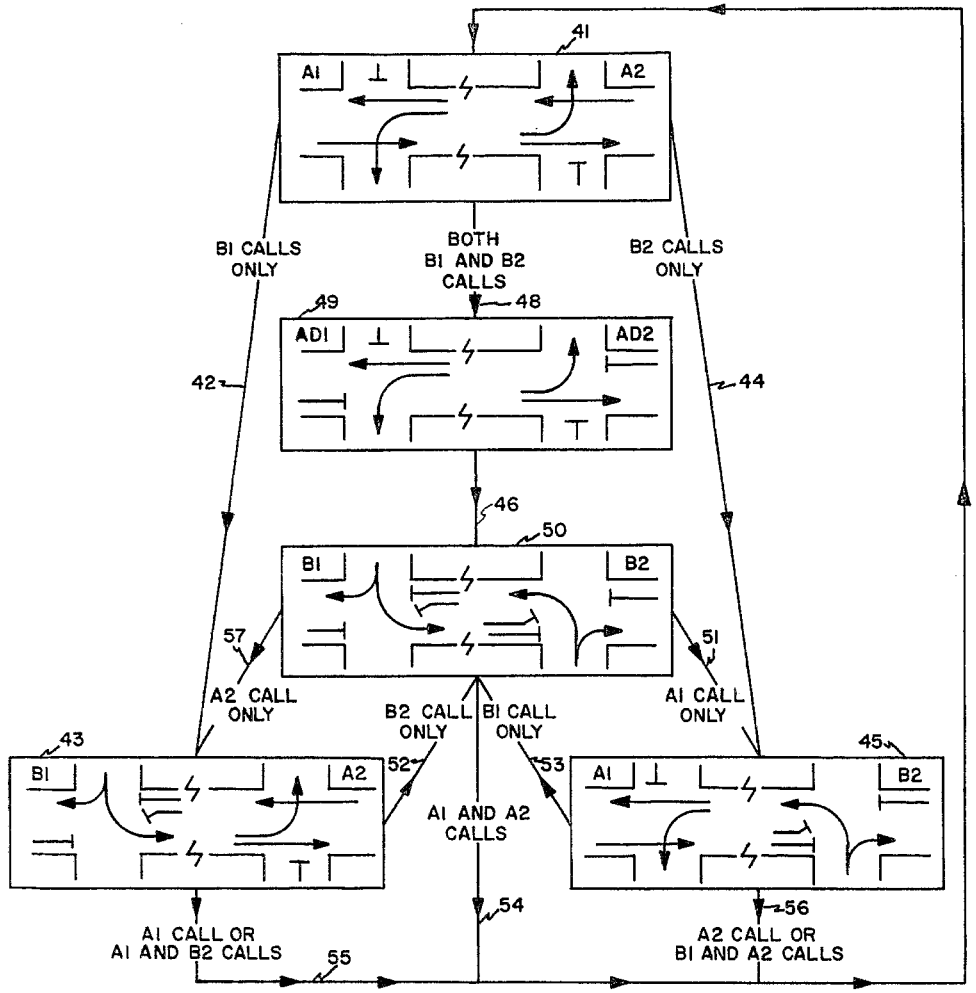
FIG. 2 is a traffic flow chart of double-entry mode operation.

Referring to FIG. 2 a traffic flow chart of double-entry mode operation is presented indicating the traffic flow combinations provided at the west intersection, numbered 1, and the east intersection, numbered 2, with the sequence of traffic flow combinations being indicated according to the calls received. For convenience of description each block includes a representation of two intersections one on the left interior and one on the right interior which represent the west and east intersections respectively in FIG. 1, for example. Each traffic flow or movement given the right-of-way during a green or right-of-way period is represented in the form of an arrow with the traffic flow or movement not then receiving right-of-way represented by a "T." Each of the combinations of movements at an intersection has been labeled A, AD or B, as the case may be. Such right-of-way period is often referred to as a "phase" which usually includes the green right-of-way and the yellow or clearance period following the green right-of-way period. Withdrawal of right-of-way is generally indicated by a red signal and thus it is assumed that the traffic signals represented in FIG. 1 may provide right-of-way indication to traffic at the intersections. Each letter which labels a combination of traffic movements at each intersection also has a number, with number 1 referring to the west intersection and number 2 referring to the east intersection.

Thus there are the signals providing A, AD or B traffic movement combinations or phase combinations at intersection number 1 (west) and A, AD or B traffic movement combinations or phase combinations at intersection number 2 (east). The various "calls" indicate that the vehicle traffic at the combined intersections is such that one or more vehicles have actuated the vehicle detector associated with a traffic movement then held stopped, since right-of-way is with another traffic movement and a call for desired traffic movement is made during the time right-of-way is granted to some other traffic movement. Due to the presence of the call or calls for a change in right-of-way by the traffic controller, the signal combination will be changed, such change in signal combination being made in accordance with what traffic movement is then receiving right-of-way and what traffic movement is then demanding right-of-way, as expressed by call or calls by vehicle traffic.

The combined group of traffic flows have been labeled A1, AD1 and B1 for the west intersection and A2, AD2 and B2 for the east intersection.

The combined traffic flows at the top of the chart show, in block 41, traffic movements provided by the signals of the west intersection giving right-of-way to artery traffic flows #1, #2 and #3 while the ramp traffic from the north is held stopped and these combined flows have been labeled A1. The traffic flows of the east intersection show that right-of-way has been given to artery traffic flows #1, #2 and #3 while the ramp traffic from the south is held stopped, and have been labeled A2.

The labels B1 and B2 have been given to traffic flows at the west and east intersection respectively as in block 50, when right-of-way has been given to traffic entering the intersection from the exit ramp of the expressway while all artery traffic is held stopped. The chart shows that any of four combinations of traffic flows are possible as A1 and A2, block 41, B1 and B2, block 50, B1 and A2, block 43, or A1 and B2, block 45, according to the demands of traffic as indicated by actuation of one or more vehicle detectors thereby providing the call for the various combination of signals at the intersections.

It will be noticed that when the signal combination of A1 and A2 is showing, a call for a change of signal indication providing a change in traffic flow at only one of the intersections provides a change of signal indication and traffic flow only at that one intersection. That is, with the A1 and A2 combination as in block 41 and there is a call for B1 only, as indicated by line 42, the signal indication at number 1 (west) intersection will change so as to provide traffic flow B while the signal indication at number 2 (east) intersection will be held so that the traffic flow combination will then become B1 and A2 as in block 43. With traffic flows A1 and A2 and a call for B2 only, as by line 44, the signal indication at number 2 (east) intersection will change so as to provide traffic flow B and the signal indication at number 1 (west) intersection will be held so that the traffic flow combination will then become A1 and B2 as in block 45.

When the signal combination at the intersections provide the A1 and A2 flow combination and there are calls for B1 and B2 as indicated by line 48 then, the signal sequence of both sub-controllers provides that right-of-way will be withdrawn from artery traffic flow #2 while right-of-way is maintained to artery traffic flows #1 and #3. This combination of traffic flows at one intersection may be referred to as a "lagging green" or "delayed clearance," and has been labeled AD which may be used to indicate the delayed A traffic flow so that the particular traffic flows at the west and east, intersections respectively, have been labeled AD1 and AD2, as in block 49. The signal combination, producing such traffic movement, will change without additional calls, as indicated by line 46, to a B1 and B2 movement as shown in block 50, after a timed period.

The signal combination providing the B1 and B2 traffic flow combination may change in response to an A2 call only, as by line 57, into B1 and A2, block 43 flow combination while an A1 call only as via line 51 during B1 and B2 traffic flow may change to A1 and B2, block 45.

The flow combination B1 and A2, block 43, may in response to a B2 call only, as by line 52, change to B1 and B2, block 50 while the flow combination A1 and B2, block 45 may in response to a B1 call only, as by line 53, change to B1 and B2, block 50.

When the signal combination providing the traffic flow B1 and B2 is being displayed, calls for A1 and A2, as by line 54, will cause a change in signal combination so as to provide the traffic flow A1 and A2, block 41. When the combination of B1 and A2, block 43, is being provided, a call for A1 only or calls for A1 and B2, as by line 55, will result in a change in signal combination so as to provide the traffic flow A1 and A2, block 41. The call for A1 only will cause a change in signal combinations to provide A1 and A2 after which both sub-controllers will come to rest in A1 and A2, if no additional calls are received. The calls A1 and B2 as by line 55 when the traffic flows of block 43 are permitted will cause a change into A1 and A2 and then will change into signal combinations to provide the traffic flow combination of A1 and B2, block 45, since the A1 call is first served and then the B2 call will be served.

Of course, if during the combination change last described, from the combination of block 43 to block 41 a call is received for B1 then the transition traffic flow combination AD1 and AD2, block 49, will follow A1 and A2, block 41 after which the change into the flow combination of block 50, occurs.

If the signal combination permitting flows A1 and B2, block 45 is being displayed and a call for A2 only is received, then the traffic flow combination of block 45 will change to A1 and A2 of block 41. If, however, there were calls for B1 and A2 as line 56 then the signal indications will provide that a traffic flow combination of A1 and B2, block 45, will change to A1 and A2, block 41 and then to B1 and A2, block 43.

It should be understood that a change of signal combination may be made upon termination of a vehicle interval or upon termination of the maximum limit, and completion of a last car passage period, as more fully described below, after which a yellow or clearance interval is timed. The "call" referred to relates to actuation of the vehicle detector by a vehicle not then receiving right-of-way so that in effect the detector actuation "calls" for right-of-way. Such procedure and terminology associated with vehicle actuated traffic controllers is familiar to those skilled in the art.

SINGLE-ENTRY MODE—FIG. 3

Figure 3:
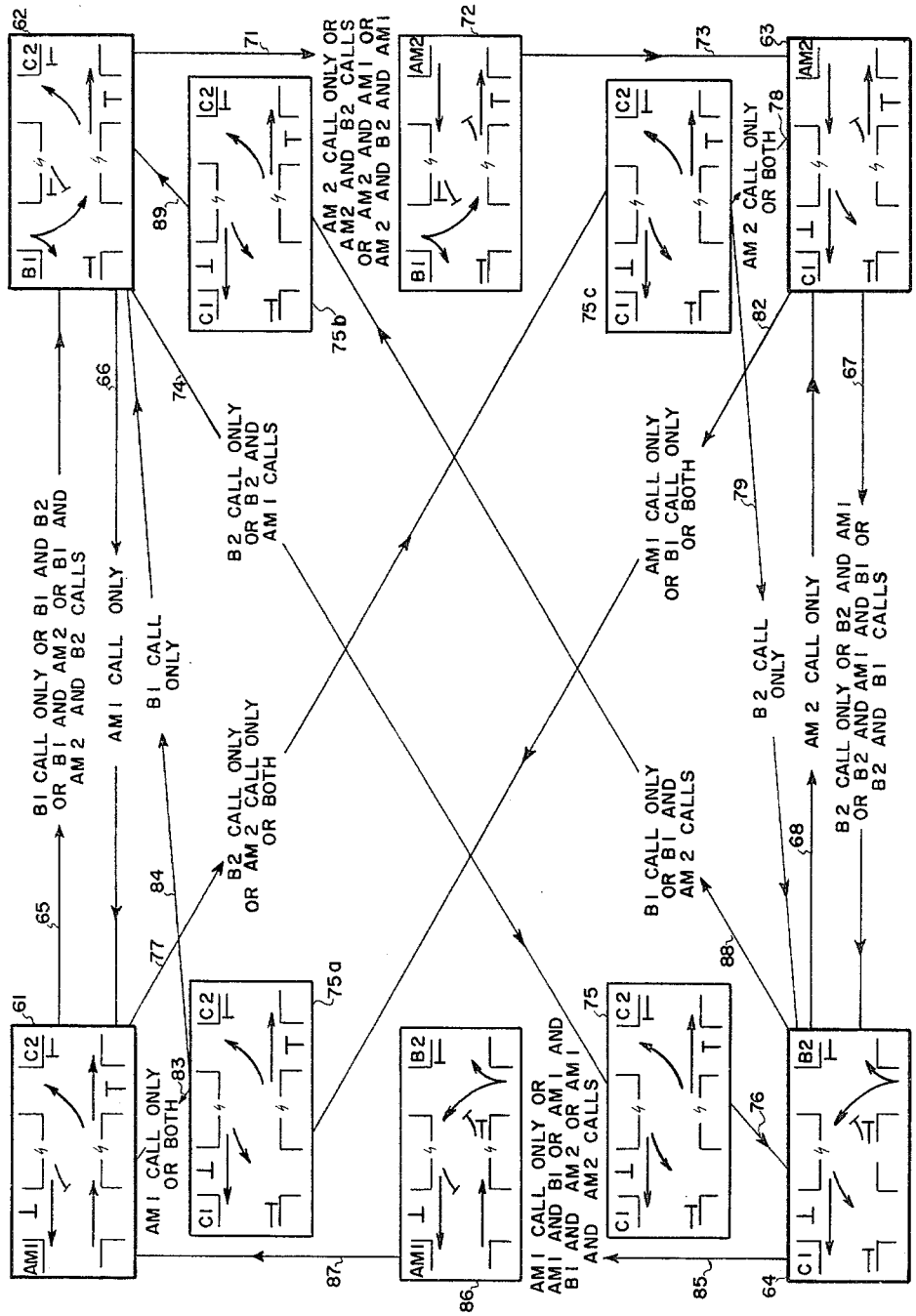
FIG. 3 is a traffic flow chart of single-entry mode operation.

Referring to FIG. 3, a traffic flow chart for single-entry mode operation is presented indicating the traffic flow combinations provided by the signal combinations at the west intersection and at the east intersection, numbered 1 and 2 respectively, which is similar to the labeling of corresponding intersections in FIG. 2.

As also shown in FIG. 2, each block in FIG. 3 includes the representation of two intersections which represent the west intersection in FIG. 1 and the east intersection in FIG. 1, labeled as mentioned above. The arrows in each of the blocks represent the various traffic flows having right-of-way through the respective intersections during a right-of-way period while the "T" represents right-of-way withdrawn from that traffic flow.

The combined traffic flows at each intersection are labeled with similar labels for similar traffic flows, although the traffic flows may be in a different direction.

The labels AM, B and C have been used with the traffic flow AM being a combination of right-of-way to artery traffic movements #1 and #2 while artery traffic movement #3 is held. Traffic flow B is similar to the traffic flow B of FIG. 2 with traffic entering the intersection from the exit ramp from the expressway and making left and right turns and with artery traffic held stopped. Traffic flow C is similar in pattern to traffic flow AD in FIG. 2, however, these traffic flow combinations are distinguishable since in FIG. 2 the traffic flow AD is a double delay clearance of traffic flow A which only occurs in a combination of AD1 and AD2 and only follows traffic flow A1 and A2 in FIG. 2 and occurs under special conditions. Traffic flow C of FIG. 3 is a clearing movement which is used in combination with AM, B or another C traffic flow and is a traffic flow condition during which the subcontroller indicating the same may rest.

As will be more fully described with reference to the circuit diagram, the signal indication producing the traffic flow AD of FIG. 2 occurs in positions 12 and 13 of a twenty position line switch while the signal indication producing the traffic flow C of FIG. 3 occurs in positions 1 thru 5 of the same line switch. Further distinguishing the two traffic flows is the fact that traffic flow AD in FIG. 2 is a transition traffic flow and is found only in combination with another AD flow, as seen in block 49 in FIG. 2. Such traffic flow is a fixed time period and may not be held for an indefinite period of time in normal operation. Traffic flow C in FIG. 3 at either of the intersections is a combination of signal indication which may occur in duplicate that is C1 and C2 or in combination with an AM or B traffic movement. When a C traffic flow is in combination with an AM or B flow the cyclic period during which signal indication providing such C traffic flow occurs may include a rest period and therefore may be held for an indefinite period of time, depending upon the combination of traffic flows and the calls received for transfer of right-of-way. Further, traffic flow C is in an actuated traffic flow or phase, initiated in one sub-controller upon demand of the other sub-controller.

It will further be noticed that in single-entry operation, the conflict of artery traffic flows present, in the traffic flow combination A of FIG. 2, has been eliminated and the artery traffic flow has been referred to as AM in FIG. 3, since such traffic flow may be considered a modified traffic flow movement of the traffic flow A of FIG. 2.

As seen in FIG. 3 each of the blocks 61, 62, 63, and 64 includes a C traffic flow and either an AM traffic flow or a B traffic flow, in different combinations. Each of the four combinations of traffic flows may be considered a major traffic flow combination since the composite traffic controller may come to rest in one of these four traffic flow combinations in single-entry mode operation. It should be pointed out that in accordance with single-entry mode operation one sub-controller may remain at rest indicating a C traffic flow while the other sub-controller cycles and transfers right-of-way between the artery flow and the side street or ramp flow so as to alternately provide the AM flow and the B flow.

The line 65, between blocks 61 and 62 indicates that the flow combination of AM1 and C2 in block 61 may change to B1 and C2, as in block 62, in response to a B1 call only or B1 and B2 calls or B1 and AM2 calls or B1 and AM2 and B2 calls. If B1 call only caused the sub-controller to change signal indications the composite controller may come to rest in B1 and C2. If two or more different calls caused the sub-controller to change signal indication, the B1 and C2 traffic flows will be served after which the signal indication will be changed to serve other traffic flows, according to the calls received. Line 66 shows that flow combination B1 and C2, block 62 may change to AM1 and C2, block 61, in response to an AM1 call only.

The line 67, between blocks 63 and 64 indicates that the flow combination of C1 and AM2, block 63, may change to C1 and B2, block 64, in response to a B2 call only or B2 and AM1 calls or B2 and B1 calls or B2 and AM1 and B1 calls. Line 68 indicates that flow combination C1 and B2 may change to C1 and AM2 in response to an AM2 call only.

Line 71 indicates that B1 and C2 of block 62 may change into B1 and AM2 of block 72 in response to an AM2 call only, which call may be received as an isolated call or may be the remaining call of the B1 and AM2 calls of lead 65, or such change in signal indication may be caused by AM2 and B2 calls, which may be the remaining calls from the B1 and AM2 and B2 calls of line 65, or AM2 and AM1 calls or AM2 and B2 and AM1 calls. As indicated by line 73, the flow combination B1 and AM2 of block 72 will change to C1 and AM2 as in block 63 without any additional calls. Thus it may be considered that the flow combination of block 72 is a transition traffic flow combination. Further it should be pointed out that the traffic flow combination of block 72 occurs as a transition flow between change in traffic flow combinations from block 62 to block 63. Further the traffic flow combination of block 72 is a combined signal indication in which the composite traffic controller may not rest since such signal indication will always change to the combination of block 63 without additional calls. Thus the traffic flow combination of block 72 is considered a transition flow combination which differs from the major traffic flow combinations.

Line 74 indicates that the flow combination of block 62 may change to block 75, the combination of C1 and C2 flows in response to a B2 call only or B2 and AM1 calls. The B2 call could be the remaining call of the B1 and B2 calls of line 65. The line 76 indicates that the flow combination of block 75 will change to the flow combination of block 64 without further calls and thus the C1 and C2 combination of block 75 may be referred to as a transition flow combination. It should also be noted that the composite controller does not rest in the traffic flow combination of C1 and C2 and is not considered a major traffic flow.

It will be noticed that blocks 75, 75a, 75b and 75c are all of the same traffic flow combination, that is, traffic flows C1 and C2 and each has the same characteristics referred to relative to block 75 except of course that the flow combinations of blocks 75a, 75b and 75c occurs between different major traffic flow combinations.

The combination of block 61 may change to the combination of block 75c in response to a B2 call only or an AM2 call only or a combination of both calls, as indicated by line 77, however, as indicated by line 78 an AM2 call only or both AM2 and B2 calls will cause a change from the block 75c combination of block 63 combination while, as indicated by line 79, a B2 call only which caused a change of indication from block 61 to block 75c will cause the combination of block 75c to change to block 64.

The combination of block 63 will change to the flow combination of block 75a in response to an AM1 call only or a B1 call only or both AM1 and B1 calls, as indicated by line 82. However, the change from the combinations in block 75a to the combinations in block 61 will occur when the change from the combination of block 63 to the combination of block 61 was in response to an AM1 call only or both AM1 and B1 calls as indicated by line 83 while line 84 indicates that the change will be to the B1 and C2 flow of block 62 when the call causing the change from 63 to 75a was a B1 call only.

The combination of C1 and B2 of block 64 may change to the combination of AM1 and B2 as in block 86 in response to an AM1 call only or AM1 and B1 calls or AM1 and AM2 calls or AM1 and B1 and AM2 calls, as indicated by line 85. The combination of block 86 is a transition combination traffic flow and, as indicated by line 87, the traffic flow combination of block 86 will change into the combination of block 61, AM1 and C2 without additional calls. The traffic flow combination AM1 and B2 is also not considered a major flow combination since the composite controller may not rest in such combination and the combination only occurs during the transition from block 64 to block 61.

If a call for B1 is included with AM1 or any other combinations of calls including B1 and AM1 then the combination of traffic flows in block 61 will follow line 65, as previously described. If the calls which cause the change in traffic flow from block 64 to block 61 through block 86 were AM1 and AM2 then the change of traffic flow combination from block 61 will follow line 77.

If the call for AM1 is omitted from the combination and there are calls for B1 only or B1 and AM2 calls then the combination of block 64, C1 and B2 will follow line 88 and change to 75b and as indicated by line 89 to the B1 and C2 combination of block 62.

It should be understood that the lines 83 and 84 and 78 and 79 do not indicate additional calls but merely show the change when the calls have already occurred as indicated by line 82 and line 77 respectively.

MODE SWITCHING ASSEMBLY AND INTERCONNECTIONS WITH SUB-CONTROLLERS—FIG. 4

Referring to FIG. 4, a circuit diagram of the mode switching assembly and representations of two sub-controllers, with the interconnections between the mode switching assembly and each sub-controller is presented.

Basically the function of the mode switching assembly is to serve to supervise the sub-controllers keeping both sub-controllers in the same mode of operation and to perform certain switching operations which may differ according to the mode of operation.

The mode switching assembly is a basic part of the overall composite traffic controller since it serves to supervise mode changing as well as other functions mentioned.

The mode switching assembly includes a ten position cam shaft which may rest in either position 1 or position 6. One complete revolution of the cam shaft will cause both sub-controllers to operate, in unison, in double-entry mode and in single-entry mode, according to the position of the cam shaft.

The mode switching assembly is illustrated as including a mode selection switch which includes two ganged-poles 102 and 103 each having three positions. Although this switch is illustrated as a manual switch obviously such switch may be operated by a relay or other repeating or operable device and may be located remotely or locally, as desired.

With the ganged-poles 102 and 103 in their upper position the mode switching assembly will call for double-entry mode operation. With the ganged-poles in their lower position the mode switching assembly will call for single-entry mode operation. With the ganged-poles in the center position, closure of switch 104 will call for double-entry mode operation and closure of switch 105 will call for single-entry mode operation, according to which cam contact b or c is closed at the time of closure of one of the switches.

The switches 104 and 105 may, if desired, be automatically operated by a traffic responsive means. Thus if, for example, the traffic responsive means were a traffic characteristic determining means, such as a traffic volume computer, for example, such traffic volume computer could include a volume level responsive circuit which could be employed to operate a relay or other responsive device at a desired traffic level so as to operate switch 104 and switch 105 in opposite positions, i.e. one closed and the other open to provide the desired mode of operation according to the traffic value or level. Leads 106 and 107 are shown and connect to circuitry in FIG. 7 which may be used to select the mode of operation. If the apparatus of FIG. 7 is employed with the mode switching assembly then the switches 104 and 105 would both be opened. It should be noted that switches 104 and 105 should be in alternate positions, i.e. one open and one closed, to avoid against continued cycling the mode switching assembly.

Certain detector switching functions, which could be performed by the sub-controllers are performed by the mode switching assembly. Switching of the left turn detector at each intersection (D3W and D3E of FIG. 1) is arranged so that during double-entry mode operation, detector D3W is connected to sub-controller SC1 (via lead 118), and detector D3E is connected to sub-controller SC2 (via lead 115), each serving the normal function of detectors, associated with a vehicle actuated phase of a vehicle actuated traffic controller. When operating in single-entry mode operation, the detectors D3W and D3E, normally associated with sub-controllers SC1 and SC2 respectively during double-entry mode operation, are disconnected from the respective sub-controllers and detector D3W is connected to sub-controller SC2 (via lead 116) and becomes a "call" detector for phase A of sub-controller SC2 which will provide a signal indication providing the traffic flow AM2 as shown in FIG. 3. Also during single-entry mode operation detector D3E is connected to sub-controller SC1 (via lead 117) and becomes a "call" detector for phase A of sub-controller SC1 which will provide a signal indication providing the traffic flow AM1 as shown in FIG. 3.

It will be noticed as indicated in blocks 63 and 61 of FIG. 3 that by calling for right-of-way for artery traffic (AM traffic flow) for one intersection (i.e. D3W, the vehicle detector in the left turn traffic pathway in the west intersection calls for AM2 in the east intersection), the C movement in the west intersection is provided (block 63 in FIG. 3) so as to permit left turn traffic at the west intersection to pass through the intersection. It should be noted that the left turn detector could be connected to call for right-of-way for ramp traffic (call B traffic flow) which would also provide the C traffic flow at the other intersection.

The cam shaft of the mode switching assembly is represented as being rotated by a solenoid represented by TMM. Each time TMM is operated the cam shaft is rotated one step, ten steps making a complete cycle. When TMM is pulled-in, a ratchet arm is prepared to partially rotate the cam shaft by notching into a gear (not shown) and contact TMM–1 is closed and relay TRP is energized. When TRP is energized contact TRP–1, in the operating circuit for TMM is opened and TMM drops-out pulling the ratchet arm into its former position, during which the cam shaft is partially rotated. Contact TMM–1 is opened upon drop-out of solenoid TMM thereby causing relay TRP to become deenergized. This is shown as one method of stepping a cam shaft cyclically so as to open and/or close cam contacts, although other methods may be employed, as desired.

The cam contacts are labeled *a*, *b*, *c*, *d*, *e*, *f*, *g*, *h*, *j*, and *k*, with the number of positions during which the respective cam contact is closed above the contact. For example, contact *a* is closed only in positions 2, 3, 7 and 8, cam contact *b* is closed only in position 1, cam contact *c* is closed only in position 6, *d* is closed only in positions 4 and 5, cam contact *e* is closed only in positions 8, 9 and 10, cam contact *f* is closed only in positions 4 and 5, cam contact *g* is closed only in positions 2, 3, 7 and 8, cam contact *h* is closed only in positions 8, 9 and 10, cam contact *j* is closed only in positions 5, 6, 7 and 8, cam contact *k* is closed only in positions 5, 6, 7 and 8.

Positions 1 and 6 are positions in which the mode switching assembly may rest.

REST POSITIONS FOR RESPECTIVE SINGLE-ENTRY AND DOUBLE-ENTRY MODES

In accordance with the preferred form of the invention, the mode switching assembly provides for operation by the sub-controllers in single-entry mode, during which the assembly may be at rest in position #1 and provides for operation by the sub-controllers in double-entry mode during which the assembly may be at rest in position #6. When the mode switching assembly is in position 1 the assembly may respond to a demand to change the operation of the sub-controllers into double-entry mode operation and when the mode switching assembly is in position 6, the assembly may respond to a demand to change the operation of the sub-controllers into single-entry mode operation.

In the present illustration of a mode switching assembly closure of the switch 104 may represent a demand for double-entry mode operation while closure of switch 105 may represent a demand for single-entry mode operation. In the alternate form ground applied to lead 107 may call for single-entry mode operation and ground applied to lead 106 may call for double-entry mode operation.

The relay TPM, in each of the sub-controllers may be referred to as the mode determining relay for each of the sub-controllers. When the relay TPM is energized the sub-controller is arranged to operate in double-entry mode operation. When the relay TPM is deenergized the sub-controller is arranged to operate in single-entry mode operation.

Thus among other things the mode switching assembly controls the TPM relay in each sub-controller.

SWITCHING FROM SINGLE-ENTRY TO DOUBLE-ENTRY MODE

Let it be assumed that the mode switching assembly is at rest in position 1, as illustrated. In position 1 all cam contacts are open except cam contact *b*, which is closed. All relays in the mode switching assembly are deenergized. Thus the overall composite traffic controller is arranged to operate in single-entry mode.

Let it also be assumed that ganged-poles 102 and 103 are in the center positions of the three selector switch positions, as illustrated. Under these conditions, let it be assumed that a demand for double-entry mode operation is made, such demand may be made by closure of switch 104, thereby supplying a ground to pole 102. This may require reversal of the positions of switches 104 and 105 from the illustrated positions.

Upon closure of switch 104 a pull-in circuit is completed for solenoid TMM from positive power, represented by a plus in a circle, through the coil of TMM, closed contact TRP–1, cam contact *b*, pole 102 of the selector switch, switch 104 to ground. Solenoid TMM closes contact TMM–1 and relay TRP becomes energized and opens its contact TRP–1 thereby opening the pull-in circuit for solenoid TMM. TMM drops-out and advances the cam shaft to its position #2. In position 2 cam contact *b* opens and cam contacts *a* and *g* close. Cam contact *g* completes a circuit to operate relay CBR. Relay CBR thus closes its contacts CBR–1 and CBR–2 each of which complete circuits to the sub-controllers SC1 and SC2 respectively via leads 108 and 109 respectively to put a call in each sub-controller for demand for right-of-way for phase B. Such demands may provide a signal indication in each sub-controller so as to record right-of-way to traffic flows and provide a traffic flow pattern such as labeled B1 and B2, block 50 in FIG. 2 for example.

Cam contact *a* completes an operating circuit for TMM which pulls-in and is dropped-out, as previously described and advances the cam shaft into position 3. Advance of the cam shaft into position 4 is similar to the advance into position 3. While the contact of relay CBR are held closed, ensuring sufficient time for registering the calls for demand for right-of-way for phase B, the cam shaft is advanced into position 4 and cam contacts *a* and *g* open and cam contacts *d* and *f* close.

Cam contact *d* prepares an operating circuit for TMM but contacts TR1–1 and TR2–1 are both open. Relay TR1 is a repeater relay of the relay TPM (TPM1) in sub-controller SC1 and TR2 is a repeater relay of the TPM relay (TPM2) in the sub-controller SC2.

Cam contact *f* closes a pull-in circuit for relay CAR which relay pulls-in and closes its contacts CAR–1 and CAR–2. Contact CAR–1 prepares a pull-in circuit via lead 110 for relay TPM in sub-controller SC1 and contact CAR–2 prepares a pull-in circuit via lead 112 for relay TPM in sub-controller SC2. This circuitry between the mode switching assembly and the respective sub-controllers is symmetrical. As will be more fully described below, when a sub-controller is in B phase, its relay BR is pulled-in thus its contact BR–1 will be closed in its up condition which, under the present assumed conditions further prepares the pull-in circuit for relay TPM. When the sub-controller is in its "vehicle interval" position its relay VI will pull-in and close its contact VI–1 thus completing the pull-in circuit for relay TPM in the sub-controller and the corresponding repeater relay TR1 for SC1 and TR2 for SC2. Thus change of mode from single-entry to double-entry is accomplished in the phase B vehicle interval.

When the TPM relay (TPM1) and TR1 relay, associated with sub-controller SC1 via lead 113, pull-in, contact TR1–1 closes. When the TPM relay (TPM2) and TR2 relay, associated with sub-controller SC2 via lead 114, pull-in, contact TR2–1 closes. Thus with cam contact *d* closed and contacts TR1–1 and TR2–1 closed the prepared operating circuit for TMM is closed. Operation of TMM advances the cam shaft into position 5 which holds cam contacts *d* and *f* closed and further closes cam contacts *j* and *k*.

Closure of contacts *j* and *k* close holding circuits for relays TR1 and TR2 respectively. The same circuits respectively, also form parts of holding circuits for the associated TPM relay of each sub-controller through a respective holding contact, TPM–1, as seen in SC1.

The cam shaft is advanced to position 6 and cam contacts *d* and *f* open and cam contact *c* closes.

Position 6 is the rest position of the mode switching assembly when the composite traffic controller is in double-entry mode operation.

It may be desired to make provision preventing the composite traffic controller from leaving double-entry mode operation for at least a minimum time after having just arrived therein. In this connection a timing means may be associated with cam contact *c* so that when the cam contact is first closed the timing means times a period during which the cam shaft may not be advanced out of position 6 but, after such time, is free to advance out of position 6 upon a demand to so advance. By using such timer, rapid change between the two modes of operation is prevented. Of course, similar minimum time control means may be employed relative to a change from single-entry mode to double-entry mode, if desired, that is the advance out of position 1.

When the relays TR1 and TR2 were deenergized, in position 1, for example, contacts TR1–2 and TR2–2 were both in their lower closed position, as illustrated. Thus with relays DC1, DC2, CH1 and CH2 deenergized and their respective contacts DC1–1, DC2–1, CH1–1 and CH2–1 closed, two individual circuits were completed to channel actuations of the detectors D3W and D3E to sub-controller SC2 and SC1 respectively via leads 116 and 117 respectively.

As seen in FIG. 1 detector D3W is connected to the block MSA (mode switching assembly) shown in FIG. 4, via lead 32 and according to the mode of operation of the traffic controller, which may be determined by the condition of the associated relay TPM and its repeater relay TR1, the detector D3W is switched between sub-controller SC1 and SC2.

In FIG. 4, the mode switching assembly is illustrated as being at rest in position #1 with cam contact *b* closed and all other cam contacts open. Thus, as previously stated the composite traffic controller (TC in FIG. 1) is in single-entry mode operation and as seen in FIG. 1 detector D3W is connected to the mode switching assembly MSA through lead 32. FIG. 4 shows lead 32 which, in the circuit of the mode switching assembly leads to the lower closed contact TR1–2, contact DC1–1, contact CH1–1, lead 116 to sub-controller SC2. Detector D3E is connected to the mode switching assembly through lead 35, which in the circuit of the mode switching assembly leads to the lower closed contact of TR2–2, contact DC2–1, contact CH2–1, lead 117 to sub-controller SC1. FIG. 5*b* shows the detector relay AD connected to a lead labeled 117 and also 30, 118 and 244.

It will also be noticed in FIG. 1 that detector D1W is connected to the mode switching assembly via lead 31 while the circuit following lead 31 in FIG. 4 shows that the detector is disconnected from its associated sub-controller SC1 by the mode switching assembly via open contact TR1–3 while detector D1E connected to mode switching assembly via lead 34 is disconnected from its associated sub-controller SC2 by the mode switching assembly via open contact TR2–3.

When the relay TPM of the sub-controller SC1 and its associated relay TR1 in the mode switching assembly become energized contact TR1–2 is pulled-up so that the detector D3W is disconnected from sub-controller SC2 and is connected to sub-controller SC1 via lead 118. Also contact TR1–3 is closed to connect detector D1W to sub-controller SC1 via lead 118.

When the relay TPM associated with sub-controller SC2 and its associated relay TR2 become energized, contact TR2–2 is pulled-up and disconnects detector D3E from sub-controller SC1 and connects D3E to sub-controller SC2 via lead 115. Also contact TR2–3 is closed and connects detector D1E to sub-controller SC2 via lead 115.

Thus the mode switching assembly may rest in position 6 and await closure of switch 105 by whatever means is employed to close same or await a ground connection to lead 107 or the moving of ganged-poles 102/103 to their lower position.

SWITCHING FROM DOUBLE-ENTRY TO SINGLE-ENTRY MODE

Let it be assumed that after a substantial time the switch 105 is closed. It is assumed that the switches 104 and 105 would be in opposite conditions, that is when one is closed and the other is open, thus switch 104 would open as 105 closes. However, it should be pointed out that cam contact *b* is now open and even if switch 104 were closed it would be ineffective at this time. It should be also pointed out that it is not necessary for the switch 104 or 105 to remain closed or a ground via lead 106 or 107 remain applied. Momentary closure or a ground pulse may start the mode switching assembly through its mode changing operation, after which the switch may again be opened or the pulse removed without interrupting the cycle of the mode switching assembly.

With switch 105 closed a circuit is completed to operate solenoid TMM through closed cam contact *c*. Operation of TMM causes the advance of the cam shaft into position 7 at which time cam contact *c* is opened and cam contacts *a* and *g* are closed with contacts *j* and *k* remaining closed.

Closure of cam contact *g* completes a circuit to energize relay CBR which closes its contacts CBR–1 and CBR–2 and, as previously described, provides a demand for right-of-way for the B traffic movement or a call for B green phase to each sub-controller via leads 108 and 109 respectively. Cam contact *a* closes and completes an operating circuit for TMM so that the cam shaft is advanced through positions 7, 8 and into position 9.

In position 8 cam contact *e* also closes to prepare a circuit for operating TMM which circuit is completed when contacts TR1–4 and TR2–4 close. Cam contact *h* also closes and pulls-in relay CCR which closes contacts CCR–1 and CCR–2 which complete a holding circuit via lead 120 to SC1 and via 121 to SC2 for the TPM relay, overlapping the holding circuit previously described for the TPM relays through cam contacts *j* and *k*.

In position 9 cam contacts *a, g, j* and *k* open with *e* and *h* remaining closed. Cam contact *e* holds the prepared circuit for operating the solenoid TMM when both relays TPM and their associated relays TR1 and TR2 are deenergized. Cam contact *h* holds relay CCR energized so as to hold contacts CCR–1 (associated with SC1) and CCR–2 (associated with SC2) closed so as to ensure that the associated relay TPM will drop-out only during the B phase of the sub-controller, that is when contact BR–1 is in its upper closed condition.

When each sub-controller arrives in its B phase their respective associated relays TPM will drop-out as will the associated repeater relays TR1 and TR2. When relay TR1 and TR2 drop-out contacts TR1–4 and TR2–4 will close and complete the prepared operating circuit for solenoid TMM.

Thus the cam shaft will be advanced into position 10 and thence into position 1 where all cam contacts will open except cam contact *b*.

In position 1 the mode switching assembly may come to rest in single-entry mode and will await a call or demand to change to double-entry mode operation indicated by closure of switch 104 or a ground applied to lead 106, or operation of poles 102/103 to their upper position.

CIRCUIT DIAGRAM OF SUB-CONTROLLER—FIGS. 5a, 5b AND 5c

Referring now to FIGS. 5a, 5b and 5c the circuit diagram of one sub-controller in its preferred form is presented with certain interconnecting circuitry between the sub-controller and the mode switching assembly and interconnecting circuitry between two companion sub-controllers illustrated, with the interconnecting circuitry blocked off in broken line blocks with indication as to whether the block is part of the other sub-controller (SC2) or the mode switching assembly, (MSA).

INTERLINKING BETWEEN SUB-CONTROLLERS—FIGS. 6a AND 6b

It should be understood that FIGS. 6a and 6b more completely show the interconnecting circuitry between the two sub-controllers and FIG. 4, described below, shows the interconnections between each of the sub-controllers and the mode switching assembly.

IDENTIFICATION OF CIRCUIT BLOCKS IN FIGS. 5a, 5b AND 5c

Generally FIG. 5a includes the several timing circuits which are boxed off in different units in which box 131 includes the normal interval timing circuits, box 132 includes skip time circuitry, box 133 includes gap time reduction circuitry, box 134 includes vehicle passage timing circuitry, box 135 includes the added initial time circuitry and box 136 includes the maximum interval timing circuitry.

FIG. 5b generally includes the memory circuits in block 139, the interconnected yield and coordination circuitry for each phase, of the sub-controller, block 140, the mode determining relay circuitry, block 141, certain of the sets of signal circuits and output circuits, blocks 142 and 142a, part of the detector relay circuits, block 143 and the operating circuitry for the motor magnet, block 144.

FIG. 5c generally includes the phase determining and skip control circuitry, block 148, interval sequence selection circuitry and signal operating circuitry in block 149.

With reference to the circuit drawings in the FIGS. 4, 5a, 5b, 5c, 6a and 6b it should be understood that as among the various circuit drawings there are certain duplications of circuitry. Thus similar components such as identical relays and identical relay contacts are labeled identically. Also with respect to FIGS. 4, 5a, 5b, 5c, 6a and 6b it should be understood that the relay contacts have been coded so that the designation of the controlling relay appears in the designation of the contact, as for example relay AR controls relay contacts AR–1, AR–2, etc.

INTERCONNECTIONS BETWEEN AND WITHIN SUB-CONTROLLERS—FIGS. 6a and 6b

FIGS. 6a and 6b show the interconnecting circuitry, between two sub-controllers and circuitry in the sub-controllers that are interconnected with the mode switching assembly. For purposes of distinguishing the circuitry of one sub-controller the number 1 and number 2 has been added to the label of the components in the sub-controller SC1 and SC2 respectively. The relays and relay contacts in FIGS. 6a and 6b correspond to relays and relay contacts in FIGS. 5a, 5b or 5c in which the number has been deleted, except where the circuitry is external to the one sub-controller. Thus, for example in FIG. 5c relays AR, BR and CR appear with contacts AR–1, BR–1 and CR–1 etc. In FIGS. 6a and 6b the relay contacts in sub-controller SC1 of AR1–1, BR1–1 and CR1–1 appear and correspond to contacts AR–1, BR–1 and CR–1 in FIG. 5c. In sub-controller SC2 in FIGS. 6a and 6b for example, relay contacts AR2–1, BR2–1 and CR2–1 appear and correspond to contacts AR–1, BR–1 and CR–1 in FIG. 5c.

NORMAL INTERVAL TIMING

Referring to FIG. 5a block 131 illustrates the preferred circuitry of the normal interval timing circuit which controls the condition, that is energized or deenergized, of relay AS.

The circuitry includes a linear rate charging circuit similar to that fully described in my copending application Serial No. 133,020 filed Aug. 18, 1961 under the title Traffic Control System and Controller. The arrow 160 in block 131 connects with arrow 160 in block 135. The combination of the circuitry in block 135 connected to block 131 provides a traffic variable initial interval or added initial interval circuitry in the respect that the time of the initial interval of one phase may be varied according to the amount of vehicle traffic crossing the detector associated with that phase while right-of-way is withdrawn from the phase.

In the upper left corner of block 131 are three contacts CR–2, AR–2 and BR–2 each connected to a common lead going to P.D., which represents a potential divider. Contact AR–2, as all contacts having the prefix AR, is controlled by the relay AR shown in FIG. 5c, contact BR–2, as all contacts having the prefix BR, is controlled by the relay BR shown in FIG. 5c and contact CR–2 is controlled by the relay CR shown in FIG. 5c.

During the cyclic operation of the sub-controller the relay CR is operated (energized) when the sub-controller is arranged for single-entry mode operation (relay TPM in FIG. 5b deenergized) and the wiper 161 of the line switch bank 2 in FIG. 5c is in positions 1–5 when phase C is not skipped. These positions will be referred to as phase C or the phase C positions. The relay AR is operated when the wiper 161 of bank 2 is in positions 6 through 13 when phase A is not skipped and in positions 14 through 20 when phase B is skipped. The positions 6 through 13 will be referred to as phase A or the phase A positions. The relay BR is operated when the wiper 161 of bank 2 is in positions 14 through 20 when phase B is not skipped and in positions 1 through 5 when phase C is skipped. The positions 14 through 20 will be referred to as phase B or the phase B positions.

Positive direct current (D.C.) power from the potential divider (P.D.) is applied to the several adjustable timing resistors in the timing circuit so that individual adjustment of the time of the several intervals may be made, as desired.

The contacts CG–1, YL–1, IR–1 and OY–1 are closed upon energization of the relays CG, YL, IR and OY respectively (shown in the lower part of block 149 in FIG. 5c). Relay CG may be energized when the wiper 162 is in position 4, 12 or 19 and may provide power for setting the clearance green period. Relay YL may be energized when wiper 162 is in position 5, 13 or 20 and may provide power for setting the yellow clearance period. Relay IR may be energized when wiper 162 is in position 7 or 15 and may provide power for setting the initial interval and relay OY may be energized when wiper 162 is in position 11 and may provide power for setting the outside artery yellow clearance period.

As seen in FIG. 5c energization of relay CG depends upon the position of the wiper contact of bank 5 and the condition of relays ACD, BDC and CDC of FIG. 5c which control contact ADC–1, BDC–1 and CDC–1, and in position 4, the condition of relay JA, which controls contact JA–1.

Energization of relay IR depends upon the position of wiper 162 and the condition of relays ST, JA, JB and JC, the latter relays controlling their contacts ST–1, JA–2, JB–1 and JC–1 respectively.

Energization of relay OY depends upon the position of wiper 162 and the condition of relay ADC which controls contact ADC–2.

TIMING CIRCUIT OF BLOCK 131

Referring particularly to the timing circuitry of block 131, it should be understood that, when the sub-controller is operating, one of the relays AR, BR or CR will be energized and therefore one of the contacts CR–2, AR–2 or BR–2 will be closed. Each contact controls application of direct current (D.C.) power, obtained from the potential divider, to a group of parallel adjustable timing resistors. When contact CR–2 closes D.C. is applied to adjustable timing resistors 171 and 172 of block 131, 173 of block 134 and the potential divider 174/175 of block 136. When contact AR–2 closes D.C. is applied to adjustable timing resistors 177, 178, 179 and 180 in block 131, resistor 181 in block 133, resistor 182 in block 134 and 183 in block 136. When contact BR–2 closes D.C. is applied to adjustable timing resistors 185, 186 and 187 in block 131, 188 in block 133, 189 in block 134 and to contact TPM–2, which selects between adjustable timing resistors 190 and 191 in block 136.

The contacts CG–1, YL–1, IR–1 or OY–1 select one adjustable timing resistor for the set of adjustable timing resistors having D.C. applied to the same and the D.C. is applied to the grid of tube 195.

The value of D.C. applied to the grid of tube 195 depends upon the setting of the adjustable resistor selected and such D.C. controls the amount of conduction of tube 195. The amount of conduction of tube 195 determines the bias applied to timing capacitor 196. The resistors 197 and 198 between a D.C. supply of some +250 volts, for example, and capacitor 196, provide a charging circuit for charging the capacitor 196 linearly, since the neon lamps 201 and 202 provide a constant voltage drop source between the junction of resistors 197 and 198 and the cathode of tube 203. Capacitor 196 is connected to the grid of tube 203 so that the potential across capacitor 196 is applied to the grid of tube 203 and controls the conduction of tube 203. As the potential across capacitor 196 increases the amount of conduction of tube 203 increases. The cathode voltage of tube 203 is applied to the grid of tube 204 via the lower set of contacts of IR–2 when the relay IR is deenergized.

OPERATION OF MOTOR MAGNET BY TIMER TO ADVANCE STEPPING SWITCH

When the potential applied to tube 204 becomes sufficiently high tube 204 begins to conduct and tube 205 (being normally conducting) reverses its condition to become non-conductive. Tube 204 draws a surge of current and operates relay AS which closes its contact AS–1 (FIG. 5b) which completes an operating circuit for motor magnet MM (FIG. 5b) which pulls-in and reverses its contacts. Contact MM–1 and MM–2 close (FIG. 5a) upon pull-in of motor magnet MM with contact MM–2 shunting capacitor 196 thereby reducing the potential across capacitor 196 and contact MM–1 substantially reducing the potential applied to the grid of tube 204 to substantially ground thereby cutting off conduction of the tube and tube 205 resumes its conductive state and relay AS becomes deenergized. Relay AS drops out and open its contact AS–1 thereby restoring motor magnet MM to a deenergized condition where upon the motor magnet restores its contacts to their normal condition and also advances the wipers on the several banks of the stepping switch in unison to the next position.

As indicated by the arrow 160 in block 131 and the arrow 160 in block 135 the two arrows are electrically connected so that the tube 207 is controlled, via grid-control by the voltage provided by the circuitry in block 135.

When relay IR is energized the upper contacts of IR–2 are closed and the cathode voltage of tube 207 is applied through diode 208 and through the upper contacts of IR–2.

ADDED INITIAL INTERVAL CIRCUIT—BLOCK 135

Block 135 shows the added initial circuitry for the phase A and for the phase B which circuitry is selected by contacts AR–3 and BR–13.

Generally, when relay AR is deenergized (during phase B right-of-way and during phase C right-of-way), and relay AM is energized (when there is no demand for a return of right-of-way to phase A) capacitor 210 is charged from the potential divider between +150 volts and ground, through the upper contacts of AM–1, the lower contacts of AR–4, capacitor 210 to ground. When a vehicle actuation causes deenergization of relay AM (indicating a demand for right-of-way) contact AM–1 closes its lower contacts. Relay AD is energized each time there is a phase A vehicle actuation and upon closure of contact AD–1 upper contacts, part of the charge on capacitor 210 is "bucketed," into capacitor 212. Upon return of contacts AD–1 to the lower position the capacitor 212 is discharged. For each subsequent phase A vehicle actuation part of the charge on capacitor 210 is transferred to capacitor 212 and dissipated. When right-of-way is transferred to phase A the relay AR is energized and contact AR–3 connects the upper circuitry of the added initial circuitry to the grid of tube 207 via the connections indicated by the arrows 160.

When relay IR becomes energized the cathode voltage of tube 207 is applied through diode 208 and contact IR–2 to junction 213. The cathode voltage of tube 203 is applied through diode 206 to junction 213. Also the potential applied through resistor 214 is applied to junction 213. In this network the lower of the two cathode voltages applied through their respective diodes 206, 208 will forward bias its associated diode and will reverse bias the other diode so as to provide a current path to the respective cathode having the lower voltage for the power applied through resistor 214, thus applying such lower voltage to cathode 213. When both cathode voltages increase, the lower of the two voltages thus applied at junction 213 and via diode 211 to capacitor 216 and the grid of tube 204, will control the conduction of tube 204, which will conduct and operate the timing circuit which operates relay AS as described.

Thus the lower cathode voltage and therefore the longest time will control when the initial interval will be terminated.

In normal operation of the normal interval timing circuit the timing capacitor 196 may be reset or discharged upon operation of the motor magnet MM upon advance of the wipers of the stepping switch, as by closure of contact MM–2 when relay VI is deenergized so that contact VI–2 is in its lower position or when relay TPM is deenergized so that contact TPM–3 is closed.

Also capacitor 196 may be reset during the vehicle interval when relay VI is energized through the upper contacts of VI–2 during phase A (position 8 of the stepping switch) and during the vehicle interval (relay VI energized) of phase B (position 16 of the stepping switch) through closed contacts AR–5 (closed by energization of relay AR during phase A periods) and AD–2 (closed upon actuation of the active phase A vehicle detector) or through closed contacts BR–3 (closed by energization of relay BR during phase B periods) and BD–1 (closed upon actuation of phase B vehicle detectors).

Contacts CO–1 and SP–1 provide means of preventing operation of the timing circuit by preventing conduction of tube 204 when either of the contacts CO–1 or SP–1 or both are closed.

SKIPPING OF PHASES

Bank 1 and its associated circuitry provides for the skipping of phases. Bank 6 and its associated circuitry provides for the skipping positions within a phase.

In positions 19, 20, 1, 2 and 3 of bank 1, positive power may be applied to the grid of tube 204 when relay JC is energized so as to close its contact JC–2. This provides for rapid stepping of the wiper arms of the stepping switch banks through the positions 19, 20, 1, 2 and 3 when phase C is to be skipped and certain phase B intervals are to be timed in the normal phase C positions of the stepping switch.

In positions 4 through 10 inclusive of bank 1, positive power may be applied to the grid of tube 204 when relay JA is energized so as to close its contact JA-3. This provides for rapid stepping of the wiper arms of the stepping switch banks through positions 4 through 10 when phase A is to be skipped and certain phase C intervals are to be timed in the normal phase A positions of the stepping switch.

In position 11 of bank 1 positive power may be applied to the grid of tube 204 when relay JA or relay JB is energized so as to close the contact JA-3 or JB-2, respectively. This provides for the timing of a certain phase C interval in the position 12 of bank 1 when phase A is to be skipped and also provides for rapid stepping of the wiper contacts out of position 11 so that certain phase A intervals may be timed in the normal phase B positions when phase B is to be skipped.

In positions 12 through 18 inclusive of bank 1 positive power may be applied to the grid of tube 204 when the relay JB is energized so as to close its contact JB-2 thereby providing rapid stepping of the wiper arms of the stepping switch banks through positions 12 through 18 when phase B is to be skipped and certain phase A intervals are to be timed in the normal phase B positions of the stepping switch.

Bank 6 of the stepping switch and its associated circuitry provides for the skipping or rapid stepping of the wiper arm from certain positions to the next position in the several banks when it is desirable to skip only a certain position or positions of the stepping switch without skipping substantially all the positions normally associated with one phase.

In positions 2, 6, 14 and 17 of bank 6 positive power is applied to the grid of tube 204 through wiper arm 215 thereby making positions 2, 6, 14 and 17 skip steps.

In position 3 positive power is applied to the grid of tube 204 when the contact SP2-2 is closed completing a circuit from positive power in sub-controller SC1, for example, and following through lead 217 to sub-controller SC2, for example, closed contact SP2-2 in sub-controller SC2 (see FIG. 6b) through lead 218 to sub-controller SC1, position 3 of bank 6, wiper arm 215 to the grid of tube 204.

If one of the sub-controllers is in position 3 and the SP relay of the other sub-controller is energized, the sub-controller in position 3 will be held in position 3 until the SP relay in the other sub-controller becomes deenergized and closes its contact SP2-2, for example.

Energization of the SP relay may occur in positions 3, 10 and 18 of either sub-controller.

The position 4 may be a skip position when the relay CG of the sub-controller is deentergized so that contact CG-3 is closed. The position 9 may become a skip position when the composite controller is in single-entry mode operation, that is, relay TPM is deenergized so the relay TPM-4 is closed. Position 10 may become a skip position when relay SPA is energized together with relay ADC being deenergized. Relay SPA, in FIG. 5c may become energized in positions 3, 10 and 18 through one of several parallel energizing circuits. One energizing circuit includes the normally open contact JC-3, a second energizing circuit includes the normally open contact RRA-1, another energizing circuit through the lower contacts AR-20 and the upper contacts TPM-5 or the upper contacts of AR-20, the normally closed contacts JB-3 and the lower contacts of TPM-5.

Relay ADC may be energized by completion of its energizing circuit via closure of contact RR2A-2, the upper contacts of TPM-6, contact SPA-4 and AR-7 or through the lower contacts of TPM-6 contact SPA-4 and contact AR-7. Relay ADC may hold in through its contact ADC-4 and closed contact AR-7.

In positions 11 and 12 positive power is applied through wiper 215 to the grid of tube 204 when relay ADC is energized and closes its contact ADC-5. In position 18 positive power is applied through wiper 215 to the grid of tube 204 when normally open contact SPA-5 is closed, contact TPM-7 is in its normal down position, and contact BDC-2 is in its normally closed position or when contact SPA-5 is closed, contact TPM-7 is in its up position and normally open contact CS-1 is closed.

In position 19 positive power is applied through wiper 215 to the grid of tube 204 when normally closed contact CG-2 is closed.

It should be understood that the positive power applied through the positions of bank 6, its wiper arm 215 to the grid of tube 204 is sufficiently high to charge capacitor 216 to cause conduction of tube 204 and cut off normally conducting tube 205 and the subsequent energization of relay AS. Capacitor 216 controls the rate of skip of the skip or rapid advance circuits.

The lower section of the circuitry of block 135 provides an increased initial time period for the phase B traffic and operates substantially identically to the operation of the upper circuitry previously described. Capacitor 224 performs the same function relative to phase B as capacitor 210 relative to phase A and capacitor 222 performs the same function as capacitor 212. The several contacts in the lower section of block 135 have been labeled so as to indicate which relay controls the respective contact, with a prime indication added to the relay designation.

Contact BR-13 will be in its upper position when the phase B positions of block 135 are in use and contact AR-3 will be in its lower position. During phase C, both contacts AR-3 and BR-13 are in their lower positions and line 160 will be ground thus by-passing block 135. In the normal cyclic operations of the sub-controller in single-entry operation, that is with relay TPM deenergized when the sub-controller is at rest or timing the intervals in positions 1 through 5, the phase C positions, right-of-way is provided at the intersection controlled by the sub-controller so as to provide a traffic flow in the pattern illustrated as "C" in FIG. 3. When the sub-controller is at rest or timing the intervals in the phase A positions, that is position 6 through 13, right-of-way is provided to the intersection so as to provide a traffic flow in the pattern illustrated as "AM" in FIG. 3 and when the sub-controller is in the phase B positions, that is positions 14 through 20 and is either at rest or timing the intervals in such positions, right-of-way is provided so as to provide a traffic flow pattern illustrated as "B" in FIG. 3.

MAXIMUM TIMER—BLOCK 136

Block 136 in FIG. 5a illustrates the preferred form of maximum interval timer which timer also serves as a safety timing circuit which may cause operation of the motor magnet MM in the event that the normal interval timing circuit of block 131 fails to function.

The adjustable resistors 190 and 191, associated with phase B are selected by the contact TPM-2 so that when the sub-controller is in single-entry operation (the condition illustrated) the maximum interval may be timed through the adjustable timing resistor 191 and when the sub-controller is in double-entry operation (with relay TPM energized, contact TPM-2 "up") the maximum interval may be timed through the adjustable time resistor 190. Thus, each mode of operation may provide for a different maximum time period, if desirable.

The capacitor 223 serves as the timing capacitor and may be biased by a voltage applied through one of the adjustable timing resistors or the potential divider consisting of resistors 174/175 according to which of the contacts CR-2, AR-2 or BR-2 is closed. The bias applied to the capacitor 223 adjusts the time period. This is similar to the adjustment of the time period by biasing capacitor 196 except capacitor 196 is isolated from the adjustable timing resistors by the triode 195. The resistors 226 and 227 connected between the positive D.C., and the capacitor 223 provide a charging circuit the charging rate of which is made to be linear with time due to the voltage feedback provided by the constant voltage drop lamps 228 connected between the junction of resistors 226 and 227 and the cathode of tube 229 the conduction of which is controlled through grid control by application of the potential from capacitor 223 to the grid.

When the cathode voltage of tube 229 becomes sufficiently high the normally cut off tube 230 becomes conducting and the normal conducting tube 231 becomes cut off and the current through tube 230 cause relay BS to become energized.

Energization of relay BS closes its contact BS–1 (FIG. 5b) which closes a circuit to energize motor magnet MM.

Reset or discharge of capacitor 223 is accomplished by closure of contact MM–3 upon operation of motor magnet MM or upon closure of contact ST–2. Contact ST–2 and the corresponding contact associated with capacitor 196, contact ST–1 are closed upon energization of relay ST, FIG. 5c which represents a means of manually stopping and resetting the timing capacitors 196 and 223 respectively. Capacitor 223 is also shunted by closure of contact HR–1. Contact HR–1 is closed when relay HR in block 140 in FIG. 5b is energized.

Relay HR may become energized only in positions 1, 8 and 16 of the stepping switch since the contact VI–3 controlled by relay VI is common to the several parallel energizing circuits of relay HR. One of the parallel energizing circuits includes normally open contact RRA1–3, normally open contact BM–3, normally open contact AM–4, and normally open contact VI–3. This circuit is completed when sub-controller SC2 is at rest and sub-controller SC1 has no calls for phase A or phase B. Another parallel energizing circuit includes lead 233 to sub-controller SC2, normaly closed contact AR2–8, lead 234 back to sub-controller SC1 (see FIG. 6b), contacts TPM–8, BM–3, AM–4 and VI–3. This circuit is completed when sub-controller SC2 is in phase B or phase C and sub-controller SC1 is in double-entry mode operation, has no phase A or phase B calls and is in position 8 or 16. Another parallel energizing circuit includes the lower contacts of AR–9, contacts TPM–8, BM–3, AM–4 and VI–3. This circuit is completed when sub-controller SC1 is in position 16, is in double-entry mode operation and has no calls for phase A or phase B. Another parallel energizing circuit includes the upper contacts of AR–9, switch SW–1 when closed, lead 235 to sub-controller SC2, normally closed contact AM2–3, lead 236 back to sub-controller SC1 and contact VI–3. This last circuit is completed when sub-controller SC1 is in position 8, switch SW–1 is closed and sub-controller SC2 has a call for phase A.

Referring back to block 136 in FIG. 5a, attention is drawn to the normally open contact CO–2. This contact, when closed, provides a ground connection for any potential that would otherwise be applied to the grid of tube 230 and thereby substantially ground the grid of tube 230. Such circuitry may prevent termination of a timed interval by holding the tube 230 non-conductive while permitting the normal charging of timing capacitor 223.

Relay CO, in FIG. 5b, which controls contact CO–1 in block 131 FIG. 5a and contact CO–2 in block 136 in FIG. 5a may become energized in positions 1, 8 and 16 of the stepping switch so long as the network of interconnecting circuitry fails to apply a ground connection to junction 237 which would prevent relay CO from becoming energized, or if relay CO were energized would cause relay CO to become deenergized.

CONTROL OF RELAY CO AND OF "YIELD" CIRCUITS

Certain interconnecting circuitry between the two sub-controllers which may control the condition of relay CO is illustrated in FIG. 6a. In FIG. 5b the lead 240 is shown to indicate where this interconnected circuitry is connected. Referring to FIG. 6a ground may be applied to junction 237 via lead 240 through the lower closed contacts RR1–2, lead 241 to sub-controller SC2, contact VI2–4 when closed, contact CR–2–3 when closed lead 242 to sub-controller SC1 contact VI1–5 when closed and contact CR1–4 to ground.

The purpose of this circuitry is to insure that the condition shown in block 75a for example is really a transient condition, even if resulting from certain malfunctions of the two sub-controllers.

This circuit is completed when sub-controller SC1 is in position 1 of its stepping switch and has a call or calls for phase A and/or phase B and sub-controller SC2 is in position 1 of its stepping switch.

When sub-controller SC1 is in its phase C positions and is displaying the phase C signals to traffic the relay CR is energized. With SC1 in position 2 with no demand for right-of-way to be given to phase A or phase B traffic the relay CO will be held energized. When SC1 is in position 2 relay CR is also energized and contact CR–4 in FIG. 5b (CR1–4 in SC1 and CR2–4 in SC2 in FIG. 6a) is closed. Ground may now be supplied from the mode switching assembly MSA, through the lead 124, the lower closed contacts of TR1–5, the normally open contact TR2–6, when closed and lead 123 to the "C Yield" ground. This circuit is completed when a change of mode of operation is in progress.

Ground is also applied through a circuit controlled by sub-controller SC2 through normally open contacts SP2–4 and JB2–3 whenc losed to "C Yield" ground or through SP2–4, normally closed contact JC2–4 and normally open contact BR2–4. The circuit including SP2–4 and JB2–3 contacts is closed when sub-controller SC2 is in position 10 and phase B is to be skipped. The parallel circuit including SP2–4 and BR2–4 is closed when sub-controller SC2 is in position 18 and phase C is next, in the cycle to be displayed.

Between the contact CR–4 in FIG. 5b and junction 237 is contact network forming two parallel circuits. One circuit includes normally closed contact RR–4 which is closed when sub-controller SC1 has a call or calls to transfer right-of-way to either phase A (relay AM deenergized) or phase B (relay BM deenergized) so that relay RR becomes deenergized. Relay RR is energized in positions 1, 8 and 16, the rest positions, when relay contacts VI–3, AM–4 and BM–3 are all closed.

The parallel circuit is closed in single-entry mode operation only when contact TPM–9 is closed (relay TPM deenergized) and when contact RRA–4 is closed (relay RRA deenergized, because contact RR2–1 is open). Relay RR2 is to sub-controller SC2 as relay RR1 is to sub-controller SC1.

When relay AR is energized so that contact AR–21 of FIG. 5b is closed (AR1–21 in SC1 and AR2–21 in SC2 in FIG. 6a) one or more of three parallel circuits may supply a ground connection for the "A Yield," in sub-controller SC1 through circuitry controlled by sub-controller SC2.

During single-entry mode operation, when relay contact TPM–10 is closed, yield ground may be provided through closure of normally open contact SP2–5 or CR2–5 of sub-controller SC2. Contact SP2–5 is closed when sub-controller SC2 is in position 3, 10 or 18 and contact CR2–5 is closed when the phase C traffic is receiving right-of-way as provided by sub-controller SC2.

During single-entry mode and double-entry mode operation a parallel circuit may supply ground for "A Yield" when contact AR2–10 of sub-controller SC2 is closed and when contact BR2–5 in SC2 is closed in conjunction with closure of contact RRA–5.

When relay BR of sub-controller SC1 is energized, that is during the time right-of-way is given to phase B traffic, contact BR–16 is closed to provide a ground for "B Yield."

The drawings herein illustrate the "yield" circuits connected to ground through a closed switch. It should be understood that when the composite controller is operated as one controller in a co-ordinated control system of two or more controllers, the switch may then be controlled by external means so as to keep the controllers in co-ordination with each other. The switch may be in the form of a relay contact operated by another controller in the co-ordinated control system, for example. The switch may also be operated by local auxiliary timing apparatus for providing special time period as for example to allow for pedestrian crossing.

VEHICLE PASSAGE TIME CIRCUIT—BLOCK 134

Referring to block 134 in FIG. 5a the preferred form of circuit, for timing an interval equal to the time it would normally take a vehicle to travel the distance from the detector to at least the far side of the intersection, is presented.

As shown, contact CO–3 is provided so as to ground the grid of tube 251 so that the tube may be held in a non-conducting state when such contact is closed.

Contact ST–3 is effectively across the timing capacitor 252, whn contact ST–3 is closed thereby preventing the capacitor 252 from charging.

Closure of contact AR–6, BR–6, or CR–6 respectively during the phase A, phase B, or phase C right-of-way periods respectively, provide the adjustable bias to timing capacitor 252 so as to time the time interval desired by the circuitry of block 134 according to assignment of the right-of-way.

The timing circuit of block 134 is illustrated in substantially the same form as block 131 except for isolation of the timing capacitor by tube 195 as in block 131, that is the time period is adjusted, as desired, by application of a bias voltage to the timing capacitor 252. Also a linear with time charging circuit including resistors 253 and 254 together with constant voltage lamps 256 and a source of positive potential are provided for charging the capacitor 252 linearly. The potential from the capacitor 252 is applied to the grid of tube 255 for control of the conduction of tube 255.

The cathode voltage is applied to the grid of the normally non-conducting tube 251 and also through the constant voltage drop, neon lamps 256, for example, to provide a feedback into the capacitor charging circuit to maintain the linar charging rate.

The linear charge applied to capacitor 252 may be reduced by closure of contact ST–3, for example or by closure of contact YL–6. Such reduction of the linear charge applied to the capacitor 252 may not reduce the bias applied to the capacitor.

Contact YL–6 is closed when relay YL is energized, that when the wiper of bank 5, FIG. 5c is in position 5 and contact JA–4 is in its normally closed condition, i.e. relay JA deenergized; in position 13 when contact JB–4 is in its normally closed condition, i.e. relay JB deenergized; in position 20 when contact JC–5 is in its normally closed condition, i.e., relay JC deenergized.

With contact SPA–6 in its lower closed position, that is with relay SPA deenergized so as to shunt normally closed contacts ADC–6 and BDC–3 in series, capacitor 252 may be reset to its bias level when right-of-way is accorded to phase A traffic, that is when relay AR is energized so as to close contact AR–12 and contact AD–3 closes, that is in response to an actuation of a phase A detector, or otherwise resulting in energization of the relay AD and therefore closure of contact AD–3. Capacitor 252 may also be reset to its bias level when relay SPA is deenergized and right-of-way is accorded to phase B traffic, that is relay BR is energized thereby closing its contact BR–7 and contact BD–3 is closed, that is in response to an actuation of a phase B detector, or otherwise resulting in energization of the relay BD and therefore closure of contact BD–3.

With relay SPA energized, so that the upper contacts of SPA–6 are closed the shunted series contacts of ADC–6 and BDC–3 are added to the capacitor reset circuits so that both relay ADC and BDC must be deenergized in order that the reset circuit for capacitor 252 be completed.

Relay ADC may become energized when right-of-way is accorded to phase A traffic in single-entry mode when relay SPA is also energized and in double-entry mode when sub-controller SC2 is at rest and relay SPA of sub-controller SC1 is energized. After pull-in relay ADC may lock-in through its contact ADC–4 for the remainder of the time the sub-controller of which the relay is a part, remains in phase A.

Relay BDC is illustrated in the circuit in FIG. 5c and is energized through one of several parallel pull-in circuits including the upper contacts of BR–8 in series with normally open contact SPA–7 and then through one circuit including the lower contacts of TPM–12 (relay TPM deenergized in single-entry mode) and the lower contacts of JC–6 (relay JC deenergized), lead 257 to sub-controller SC2, normally open contact JA2–5 when closed (relay JA2 of SC2 energized), lead 258 to relay BDC or through the lower contacts TPM–12, the upper contacts of JC–6 (relay JC energized), lead 258 to BDC or through the upper contacts of TPM–12, lead 258 to BDC.

Relay BDC may hold energized through its contact BDC–6 and the upper contacts of BR–8. Thus, relay BDC will become energized in position 18 when phase B right-of-way is about to be terminated. Relay BDC will also be energized when relays BR and SPA are both energized in combination with relay TPM deenergized, relay JC deenergized and relay JA2 energized or relay TPM deenergized and relay JC energized.

GAP REDUCTION TIMING—BLOCK 133 IN FIG. 5a

Block 133 in FIG. 5a illustrates circuitry that may be combined with the timing circuitry of block 131 and may provide a varying bias, as for example an increasing bias which may be applied to the timing capacitor 196 so as to progressively reduce the interval timed while the capacitor 196 is being charged by the normal linear charging rate circuit. The combination of block 131 and block 133 provides the gap reduction timing, during the resettable or extendible vehicle interval.

The circuitry of block 133 may, when connected to the circuitry or block 131 via closure of the upper contacts of VI–6 and lead 259 apply any potential from capacitor 260 to the grid of tube 195. As the potential across capacitor 260 is increased the conduction of tube 195 increases and the cathode voltage increases thus increasing the bias applied to timing capacitor 196. As the bias is increased the differential between the bias and the voltage to which capacitor 196 need be charged to cause tube 203 to conduct sufficiently so that its cathode voltage will fire tube 204, decreases. Thus, with the linear charging rate circuit as provided by resistors 197 and 198 and the feedback network of the constant voltage lamps 201 and 202, the interval timed by the charging of capacitor 196 is progressively reduced.

Thus, each subsequent actuations to reset the timing capacitor 196 during the extendible vehicle interval must occur within aforeshortened time period.

Upon termination of the extendible vehicle interval, as by failure of an actuation to occur within the foreshortened time period by a vehicle then having right-of-way, the relay AS is energized resulting in advance of the wiper arms to the next position of the stepping switch.

When relay TPM is deenergized (single-entry mode operation) the charge on capacitor 196 is shorted by closure of the discharge circuit including contacts TPM–3 and MM–2. Upon advance of the wipers to the next position, relay VI, shown in FIG. 5c, is deenergized, and the lower contacts VI–8 are closed which discharge capacitor 260, relay FP becomes energized and closes its contact FP–1 which applies a potential to the grid of tube 195 which establishes a bias on capacitor 196 from the passage adjustable resistors 182 or 189.

"LAST CAR PASSAGE" TIMING FOLLOWING EXTENDIBLE VEHICLE INTERVAL—BLOCK 134

In single-entry mode operation there are two positions in which an extendible vehicle interval may be timed, positions 8 and 16 and the position after the extendible vehicle interval position is always a skip-step. In position 10 a last car passage interval is timed by operation of the circuit in block 134.

In position 18 a last car passage interval will be timed unless a phase B delay green interval is to be timed. The phase B delay green is timed in position 19 by normal interval timing circuit.

The phase B delay green interval will be timed in position 19 if the other sub-controller (SC2) is going to its phase A from its phase C.

In double-entry mode operation there are two positions in which an extendible vehicle interval may be timed, position 8 and 16, however, in double-entry mode the position following the extendible interval, position 9 becomes a timed interval during which a last car passage time is timed while position 17 remains a skip position. A last car passage interval is timed in position 18. The last car passage time is timed by the timing circuit in block 134 which is resettable during its timing operation.

OPERATION OF MEMORY RELAYS AM AND BM—BLOCK 139 IN FIG. 5b

Memory, which will return right-of-way to a traffic flow from which right-of-way is being withdrawn is provided in phase A and phase B by deenergization or dropout of the relays AM and BM respectively.

The relay AM is energized in position 8 when right-of-way is accorded to phase A, that is during the phase A, extendible vehicle interval, via closure of contacts AR-13 and VI-7. Relay AM then locks in through its own contact AM-2.

Relay BM is energized in position 16 when right-of-way is accorded to phase B, that is during the phase B extendible vehicle interval, via closure of contacts BR-14 and VI-7. Relay BM then locks in through its own contact BM-2.

When both relays AM and BM are energized the relay CH1 in the mode switching assembly (FIG. 4) becomes deenergized.

The relays AM and BM are arranged to serve as "memory" relays for the respective phase A and B and also to register and hold a demand for right-of-way when right-of-way is accorded to another traffic phase.

When right-of-way is accorded to phase B or phase C traffic and there is no demand for right-of-way in phase A, the AM relay will be energized.

When a vehicle actuates one of the phase A detectors relay AD, the phase A detector relay, will become momentarily operated upon such actuation and contact AD-4 will close and complete a circuit through contact AOY-1 to ground out the power applied to relay AM. This causes relay AM to drop-out and thereby register a demand for right-of-way for phase A traffic.

When relay ADC is energized so that the upper contacts ADC-7 are closed contact AOY-1 is by-passed and a vehicle actuation causing closure of contact AD-4 will complete a circuit to apply ground to the positive side of relay AM thereby causing relay AM to become deenergized.

With the lower contacts of ADC-7 closed and contact AR-14 closed (relay AR energized) and contact SP-6 closed (relay SP energized), closure of contact AS-2 as by termination of a period timed by the normal timing interval, block 131 prior to termination of period timed by the timing circuit in block 134 provides a circuit via contact AS-2 and normally closed contact CS-2 to apply ground to the positive side of relay AM thereby dropping-out the relay. This provides for return of the right-of-way to phase A since it is assumed that a vehicle has been stopped between the vehicle detector and the intersection on the artery by withdrawal of right-of-way.

Relay BM functions with respect to phase B as relay AM functions with respect to phase A. Relay BM may be energized upon closure of contacts BR-14 and VI-7 with relay BM closing the upper contacts of BM-2 thereby locking relay BM energized.

Ground may be applied to the positive side of relay BM, to drop the relay out, through one of several parallel circuits. One circuit includes the normally closed contact BLR-1 and the normally open contact BD-4. When contact BLR-1 is open due to energization of relay BLR contact YL-2 may if relay YL is energized shunt the open contact BLR-1 or if both contacts BLR-1 and YL-2 are open and relay BDC is energized, contact BDC-5 will be in its upper closed position which may shunt the other contacts. A parallel circuit to supply ground to the positive side of relay BM may be completed through the lower closed contacts BDC-5 (relay BDC deenergized), normally open contact BR-9 closed (relay BR energized), normally open contact CG-4 closed (relay CG energized), normally open contact AS-3 closed (relay AS energized), and normally closed contact CS-3 closed (relay CS deenergized).

FURTHER CONTROL OF INTERVAL SEQUENCE CIRCUITS AND SIGNAL CIRCUITS IN FIGS. 5c AND 5b

Referring to FIG. 5c it will be seen that the stepping switch bank 3 positions 1 through 5 inclusive and 14 through 20 inclusive are not connected in the circuitry of the controller while positions 6 through 11 inclusive are connected in common. Positions 12 and 13 are connected together and when relay ADC is energized are connected to the positions 6 through 11 through contact ADC-8.

With the controller operating in single-entry mode, that is, relay TPM deenergized, relay AOG is energized (when relay AR is energized and relay BR is deenergized) through normally open contact AR-15, the lower contact of TPM-17 and the lower contacts of BR-8. If relay YL is also deenergized so that contact YL-3 is closed relay AOY is also energized. Relays AOG and AOY, as seen in FIG. 5b, control the signal circuits for the outside set of signals S2W at the west intersection. When operating in single entry mode both relays AOG and AOY are energized when relay AR is energized and relay YL is deenergized. Thus contacts AOG-2 and AOY-2 in FIG. 5b are in their upper closed position which provides a green (G) signal to outside artery traffic. When relay YL becomes energized, during the phase A right-of-way periods, either in position 13 or position 20 (in position 13 if phase B is to be displayed or in position 20 if phase B is to be skipped), relay AOY becomes deenergized and contact AOY-2 is closed in its lower position thereby extinguishing the green signal of the outside artery set of signals and illuminating the yellow (Y) signal of the outside artery set of signals. When relay AR is deenergized contact AR-15 is open and both relays AOG and AOY are deenergized and contact AOG-2 closes in its lower position thereby extinguishing either the green or the yellow signal previously illuminated and illuminates the red (R) signal of the outside artery signals.

Relay CLR is energized when relay CR is energized and closes its contact CR-7. Relay CLR controls part of the signal circuits controlling the set of left turn artery signals, S3E. Relay CDC may also be energized when relay CR is energized the pull-in circuit for relay CDC including normally open contacts SPA-8; normally closed contact JA-6, lead 261 to sub-controller SC2, normally open contact BR2-10 lead 262 to the relay CDC. After pull-in the relay CDC may lock in through its contact CDC-2 and contact CR-7. Relay CY is energized when relay CR and YL are both energized through the series of contacts CR-7, YL-4 and the lower closed contacts of TPM-13. Relay CY may lock in through its contact CY-1 and contact CR-7.

Relay CLR and CY, control the contact for the set of signals illuminated to left turn artery traffic S3W of FIG. 1. The signal circuits as shown in FIG. 5b indicate that with relay CLR deenergized, contact CLR-1 will be in its lower closed position and the red (R) signal of the set of signals S3W will be illuminated. With relay CLR energized contact CLR-1 is in its upper closed position and with relay CY deenergized so that contact CY-2 is in its lower closed position the contact TPM-14 in its lower closed position a green signal (G') is illuminated to left turn artery traffic.

As shown in the mode switching assembly, FIG. 4, the relay DC1 associated with sub-controller SC1 and the relay DC2 associated with sub-controller SC2 are energized from the respective sub-controllers. FIG. 5b shows that relay DC1 is connected via lead 125 to a junction 263 (also shown in FIG. 6a) so that when the green signal of the S3W set of signals is illuminated and the sub-controller is in single-entry mode operation (contact TPM-14 is in its lower closed position) then the green signal G' is illuminated and relay DC1 is energized.

Relay ACY (FIG. 5c) is energized through a circuit including normally open contact AR-16, normally closed contact JB-5 or the normally open shunting contacts CR-8 and JA-7, each series of contacts connected to normally open contact YL-5 in series with the lower closed position of contacts BR-8. Relay ACY may lock in over its contact ACY-1 and the lower closed position of contact BR-8.

PHASE DETERMINING AND PHASE SKIPPING CIRCUIT—BLOCK 148 IN FIG. 5c

Referring now to the circuit networks associated with bank 2 of the stepping switch, this network of circuitry is concerned with phase determination and phase skipping. Generally all the wiper arms of the various banks of line switches operate in unison and are uniformly in the same position of their respective bank at the same time.

Generally the positions 1 through 5 inclusive of the stepping switches are allocated to phase C, positions 6 through 13 inclusive are allocated to phase A and positions 14 through 20 are allocated to phase B. The traffic flow pattern provided during phase C green has been referred to as "C" in FIG. 3. This traffic flow pattern is provided during phase C positions only during single-entry mode operation. During double-entry mode operation the phase C is skipped, although the signals which produce an identical traffic flow pattern as in phase C at one of the two adjacent intersections are provided during the positions 12 and 13, allocated to phase A.

The traffic flow pattern provided during phase A green may be either "A" or "AM" shown in FIGS. 2 and 3 respectively. In double-entry mode operation the traffic flow pattern "A" is provided in positions 6 through 11 and if the traffic flow pattern "AD" as shown in FIG. 2, is to be provided, this signal indication will occur during positions 12 and 13. Although the traffic flow patterns of "AD" and "C" are similar, the signal indications to provide such pattern flow appear during double-entry mode only, for "AD" and then in positions 12 and 13 and in single-entry mode only, for "C" and then in positions 1 through 5. Thus "C" may be referred to as a phase of traffic signals while "AD" may be referred to as a lagging green or delay green.

In single-entry mode operation the traffic flow pattern "AM," as shown in FIG. 3 is provided in the phase A positions, however, the lagging green or delay green indication is eliminated.

The traffic flow pattern provided during phase B is the same pattern whether in single-entry or double-entry mode operation and is identical to the "B" pattern shown in FIGS. 2 and 3.

As previously stated relay CR is energized during phase C, relay AR is energized during phase A and relay BR is energized during phase B. During single-entry mode operation relay CR may be energized in positions 1 through 5 inclusive with wiper 161 providing ground through positions 1 through 5 and through the lower closed contacts of JC-7, relay CR, normally closed contact AR-17, normally closed contact BR-11 to positive power. Relay CR will open its contacts CR-9 and CR-10 which open the energizing circuits of relays AR and BR respectively thereby preventing these relays from becoming energized while relay CR remains energized. In position 2, relay FP (bank 5) becomes energized and closes its contact FP-2 and if there is a demand for right-of-way registered by phase A (relay AM deenergized) contact AM-5 will remain open and relay JA will remain deenergized. With relay JA deenergized, the phase A positions will be timed normally. When relay JA is energized, which may occur in position 2 with contact AM-5 closed (relay AM energized) the phase A positions will be skipped. When the phase A is skipped the phase C signal indications are held as the wiper arms are advanced through the phase A positions and the phase C clearance interval is timed in the phase A clearance position.

If the relay JA becomes energized relay JA-9 is closed and a holding circuit for relay JA is completed. It should be noted that this refers to single-entry mode operation and relay TPM is deenergized thus contact TPM-15 is in its normally closed position.

In positions 1 through 4 relay CLR is energized and relay CY is deenergized thus the G', green signal is illuminated to left turn artery traffic. Relay AOG is deenergized and the red signal (R) is shown to outside artery traffic. Relays BLR and ACY are both deenergized and the green (G) signal is displayed to inside artery traffic and with BLR deenergized a red (R) light is displayed to phase B traffic (SN).

OPERATION OF SUB-CONTROLLERS (FIGS. 5a–5c) IN SINGLE-ENTRY MODE

Assuming the composite controller to be in single-entry mode, in position 1, relay VI is energized via wiper 162 on bank 5 and the sub-controller may come to rest and remain in phase C if there are no calls for phase A or phase B; the other sub-controller of the composite controller is free to advance through other positions of its stepping switch or remain at rest, according to whether or not the other controller has demand for a change of right-of-way.

If there is demand for right-of-way by phase A or phase B in SC1, relay RR will become deenergized and prepare a circuit via closure of RR-4 and via contact CR-4 closed in phase C, position 1, for release of relay CO which holds SC1 at rest when energized. When the sub-controller SC2 is in its positions 3, 10 or 18, its contact SP2-4 will be closed. If SC2 is in position 3 it is either in phase B going to phase A or phase C going to phase A or phase B. If SC2 is in phase C position 3 then contact BR2-4 will be open, if in phase B position 3 then contact JC2-4 will be open. If SC2 is in position 10 it will be in phase A going to phase B or phase C going to phase B, then both contacts JB2-3 and BR2-4 will be open. If SC2 is in position 18 it is in phase A going to phase C or phase B going to phase C or phase A. If it is in phase A going to phase C its contact JB2-3 will be closed. If it is in phase B its contact BR2-4 will be closed and if it is going to phase C its contact JC2-4 will be closed. Therefore, if SC2 is in position 10, phase A going to phase C, or is in position 18, phase B going to phase C, a circuit via SP2-4 and JB2-3 or via SP2-4, JC2-4 and BR2-4 will complete the prepared circuit (via RR-4 and CR-4 to drop-out relay CO and permit controller SC1 to leave its rest condition in position 1.

Assuming there is a demand in SC1 by phase A for right-of-way and the relay CO is dropped-out via the condition of SC2, an interval is timed using the combined blocks 131 and 133 with a stable bias being applied through conduction of tube 195 to the timing capacitor 196 via the potential applied through contact CR–6.

Upon termination of the unextendible interval the wiper arms are advanced to position 2. Wiper arm 215 now applies a potential to capacitor 216 which charges, in a minimum time, and causes operation of the trigger circuit of tubes 204 and 205 resulting in advance of the wiper arms to position 3.

In position 3 relay SP in SC1 becomes energized and closes its contact SP–1 which contact grounds any potential applied through junction 213 so as to hold the normal interval timing circuit from operating. Therefore, the potential to charge capacitor 216 must come through bank 6.

Relay SPA of SC1 may also become energized. Relay SPA becomes energized via RRA–1 if sub-controller SC2 is at rest in positions 1, 8, or 16 or via SP2–3 if relay SP2 of SC2 is energized. Other conditions to energize relay SPA relate to sub-controller SC1 and are not met. Sub-controller SC2 is not at rest since it had to be in position 10 or 18 to release SC1, therefore, with SC2 in position 10 or 18, relay SP2 of SC2 is pulled in and relay SPA of SC1 is energized.

If relay SP2 of SC2 is energized contact SP2–2 is open so as to hold SC1 in position 3. Thus with SC1 in position 3 and SC2 in position 10 or 18 relay SP1 of SC1 and SP2 of SC2 will be energized and SPA1 of SC1 will also become energized.

So long as SP2 of SC2 is energized contact SP2–2 is open and SC1 is held in its position 3. As soon as SC2 moves into position 11 or 19 then a circuit is completed from a positive potential through resistor 209, lead 217 to SC2, contact SP2–2, lead 218 to SC1 position 3 wiper arm 215 to capacitor 216 to ground. Diode 211 blocks the positive potential from going to ground via contact SP–1.

In position 3 relay CDC of SC1 (in block 149 of FIG. 5c) may become energized if SC2 is in phase B (contact BR2–10 closed) position 18 and SC1 is going to phase A (contact JA–6 closed).

If relay CDC becomes energized it locks-in through contact CDC–2 and CR–7.

The advance from position 3 to position 4 is made via the rapid stepping circuit as described.

In position 4 if relay CDC has been energized the relay CG will remain deenergized because of open contact CDC–1. With relay CG deenergized contact CG–3 is closed and a rapid stepping circuit is completed via CG–3 and wiper 215. This eliminates the green delay period of the C phase traffic movement.

If relay CDC were held deenergized relay CG would become energized and open its contact CG–3 preventing operation of the rapid stepping circuit. Also, relay CG closes contact CG–1 which completes a circuit to apply a potential to the grid of tube 195 via contact CR–2 and adjustable resistor 171 to control conduction of tube 195 so as to establish a bias for timing capacitor 196 thereby setting the time of a green delay period.

In position 5 relay YL becomes energized thus closing the energizing circuit for relay CY, and relay CY becomes energized thereby causing signal G' to be extinguished and signal Y, the yellow clearance signal to be illuminated to left turn artery traffic. While the clearance yellow is displayed to left turn artery traffic the green (G) signal is held to inside artery traffic and a red (R) signal to both outside artery traffic and to phase B traffic.

Relay YL also closes its contact YL–1 in block 131 so as to provide a potential via contact CR–2 which is employed to develop a bias on timing capacitor 196 so as to establish the time of the interval to be timed. Thus the yellow clearance to left turn artery traffic is timed.

With the advance of the wiper arm to position 6, relay CR becomes deenergized and relay AR becomes energized from ground through wiper arm 161 in positions 6 through 13, the lower closed position of contact JA–10, relay AR, closed contact CR–9, closed contact BR–11 to positive power.

Relays AOG and AOY become energized while relay ACY holds energized and relays YL, CLR, and CY become deenergized.

Position 6 is a skip-step and the wiper arms are advanced to position 7 by the rapid charging of capacitor 216 through bank 6.

Position 7 is the initial interval of phase A. In position 7 relay IR may be energized which will close its contact IR–1 and provide a potential via resistor 177 and contact AR–2 to establish a bias for capacitor 196 for providing one voltage to be applied to junction 213 via diode 206 for potentially operating the trigger circuit of 204 and 205 to terminate the initial interval.

The added initial time circuitry of block 135 is electrically connected to block 131 through the upper closed contacts of IR–2 and provides a second voltage via diode 208 to junction 213 for potentially operating the trigger circuit. As previously described, the lower of the two voltages applied to junction 213, which will provide the longest time period, effectively operates the trigger circuit of 204 and 205.

Position 8 is the extendible vehicle interval of phase A. In position 8 relay IR becomes deenergized and relay VI becomes energized (bank 5). Also the reduced gap timing circuit of block 133 is connected to the normal interval timing circuit of block 131 via the upper contacts of VI–6. The normal interval timing circuit takes on the characteristic of being resettable, through vehicle actuation of the phase A vehicle detectors in that the linear rate charging potential applied to the timing capacitor may be discharged, however, during the extendable vehicle interval, the established bias on the timing capacitor is slowly progressively increased from a minimum bias established through contact AR–6 and resistor 182 to an increasingly greater bias by the block 133 so that the time of each subsequent time period is shorter than the last full time period as each time period is cancelled by vehicle actuation and a new time period started.

Since it is to reduce the time of the individual time increments of the extendible vehicle interval progressively with time, block 133 is provided which increases the charge on capacitor 260 progressively so that tube 195 may progressively increase its rate of conduction thereby establishing an increasing bias which is applied to timing capacitor 196.

During positions 1, 8 and 16 the upper contacts of VI–6 are closed and block 133 is electrically connected to block 131, however, the circuit of block 133 is effective during phase A in position 8 and during phase B in position 16 and is ineffective during position 1.

During phase A, for example, contact AR–19 is closed so that adjustable resistance 267, which may be used to adjust the rate of increase to a desired voltage level and thus control the time to reduce to a desired minimum time, is connected in series through the neon lamp 268 to the plate of tube 276. The other side of resistor 267 is connected in series through contact AR–19, a limiting resistor, diode 270 to the upper part of capacitor 260 and through capacitor 260, contact AR–6, resistance 182 to ground. The voltage on the tap on 182 is a fixed potential and sets the vehicle passage time from which the reduction in the reduced timed circuit starts. The plate of tube 276 and neon lamp 268 are connected, in common through a resistance to positive power.

Grid bias for tube 276 is obtained from the tap on potentiometer 269 in the potential divider circuit including the positive power supply, the common resistor, neon lamp 268, contact AR–20 potentiometer 269 which is connected to and the lower side of capacitor 260.

The potential applied to the grid of tube 276 bears a certain relationship to the potential at junction 274 which potential is applied through adjustable resistance 267, contact AR–19, and diode 270 to the upper part of capacitor 260.

As the grid potential causes tube 276 to conduct more heavily the potential at junction 274 is reduced and the grid potential on tube 276 is reduced.

Thus the conductivity of the tube 276 bears a relation to the potential at junction 274 which may be increased or decreased according to the adjustment of adjustable resistor 269 for phase A and adjustable resistor 263 for phase B.

This provides that the charge applied to capacitor 260, for applying a potential to tube 195 to establish the progressively increasing bias, shall increase over the period of time as set by adjustable resistors 267 or 266 regardless of the differential between the maximum time and the minimum time, as set by resistors 182 and 181 respectively.

In position 8 relay AM becomes energized through contacts VI–7 and AR–13. If there is no phase B call in SC1, relay RR will be energized through VI–3, BM–3 and AM–4. Also in position 8 relay CO may become energized.

If relay RR in SC1 is pulled-in, contact RR–4 is open. If SC2 is at rest, contact RRA–4 is also open and relay CO will remain energized holding SC1 at rest.

If SC2 is not at rest, its relay RR2 in SC2 will be deenergized and relay RRA, the repeater relay of RR2 which is in SC1 will be deenergized so that contact RRA–4 is closed. In single-entry mode, contact TPM–9 is also closed.

Assume SC2 is not at rest and contact RRA–4 is closed then, with contact TPM–10 closed, if SC2 is in phase C (contact CR2–5 closed), ground may be applied to junction 237 through contact AR–21 to keep relay CO from pulling-in. If SC2 is now in position 3 or 18 with relay SP2 pulled-in (SC2 would not now be in position 10 because of the assumed conditions), contact SP2–5 at AR–21 would complete a circuit to ground to keep relay CO from being energized. Relay BR could now be in but relay RRA is out.

Thus, if SC2 were now in phase B position 18 or phase C position 3, sub-controller SC1 would not remain at rest and keep advancing through its phase A positions. If there were no phase B call for SC1, then sub-controller SC1 would skip phase B and go to phase C.

If conditions permitted relay CO to become energized, sub-controller SC1 may go into a rest condition in position 8. Further, if there are no phase B calls registered in SC1 then relay HR may become energized. Relay HR may become energized if SC1 is in position 8 and there are no phase B calls and SC2 is at rest (contact RRA–3 closed) or SC2 is in phase A (contact AR2–8 closed).

If relay HR is pulled-in, the maximum interval timing circuit, which normally starts timing concurrently with the beginning of each interval and serves as a safety timing circuit except for the vehicle interval, during which the maximum timing circuit may limit the time that may be allocated to the interval, will be held inoperative by closure of contact HR–1 across maximum timing capacitor 223. Also, contact HR–4 closes to hold the time reduction circuit of block 133 inactive by shorting across capacitor 260 via contact HR–4 and the upper contacts VI–8.

Digressing momentarily, the relay HR may be operated to hold the maximum limit timing circuit and the time reduction circuit from operating when the composite controller is operating in double-entry mode when sub-controller SC1 is at rest in phase B or phase A and sub-controller SC2 is at rest in phase B or phase A (via closed contacts RRA–3, BM–3, AM–4 and VI–3); or when SC1 is at rest in phase B and SC2 is in phase B (via closed contacts AR2–8, TPM–8, BM–3, AM–4 and VI–3); or when sub-controller SC1 is at rest in phase B (via lower contacts AR–9, TPM–8, BM–3, AM–4 and VI–3); or when switch SW–1 is closed and sub-controller SC1 is in the phase A vehicle interval and sub-controller SC2 has a phase A call (upper contact AR–9, switch SW–1, contacts AM2–3 and VI–3).

It will be appreciated that certain phase combinations which are possible in double-entry mode operation are not possible in single-entry mode operation. Thus, in single-entry mode operation, certain relay positions in the two sub-controllers to provide energization of relay HR will not exist.

As described, the HR relay may become energized when the CO relay is energized. However, under certain combined conditions of the sub-controllers, the HR relay of a sub-controller may become deenergized while the CO relay of the same sub-controller may remain energized. Deenergization of the HR relay permits both the maximum limit timing circuit and the time reduction circuitry to operate while the energized relay CO holds the trigger circuit in the maximum interval timing circuit and the normal interval timing circuit from operating.

If, for example, conditions of the sub-controllers SC1 and SC2 cause the HR and the CO relays of SC1 to become energized then the timing circuits of SC1 will become inoperative. With SC1 in such condition, assume that the HR relay of SC1 is dropped-out by the circuitry controlled by the sub-controller SC2 but relay CO remains energized. This will permit the maximum timing circuit of SC1 to start timing the maximum interval, however, the relay CO, still energized, will hold the trigger circuit of the maximum interval timing circuit from operating. At the same time, the time reduction circuit is permitted to operate but the relay CO will hold the trigger circuit of the normal interval timing circuit from operating.

LINKING CONTROL OF MAXIMUM TIMING AND TIME REDUCTION CIRCUITS BETWEEN SUB-CONTROLLERS

This may provide that under certain conditions the maximum interval timing circuit and the time reduction circuit of both sub-controllers may start at the same time. Now, if the CO relay of the sub-controller SC1 is dropped-out through cooperation of the two sub-controllers, the controller SC1 would not be permitted to remain in its current phase longer than the maximum limit time, started as of the time of drop-out of its HR relay.

FURTHER OPERATION OF CIRCUITS FOR SINGLE-ENTRY MODE OR DOUBLE-ENTRY MODE

Returning to single-entry mode operation with sub-controller SC1 in position 8, at termination of the vehicle interval as by operation of the normal interval timing circuit (blocks 131 and 133 in position 8) or by operation of the maximum limit timing circuit, block 136, the wipers are advanced into position 9 and the charge on capacitor 196 from the linear rate charging circuit is discharged through closed contacts TPM–3 and MM–2 and the charge across capacitor 260 is discharged through closure of contacts VI–8 as relay VI drops-out.

Relay FP becomes energized and its contact FP–3 closes so that if there is no phase B call (relay BM energized) and contact BM–4 is closed, relay JB will become energized. With relay JB energized, the phase B green and clearance signals will not be shown and certain of the phase A intervals will be timed in phase B positions. If there is a call or demand for right-of-way by phase B traffic then the relay BM will be deenergized, contact BM–4 will be open and relay JB will not become energized.

Relay FP also closes contact FP–1 and applies a potential via contact AR–2 adjustable resistor 182 and contact AR–6 to tube 195. However, closed contact TPM–4 of bank 6 provides a rapid charge to capacitor 216 and positions 9 becomes a skip step.

In position 10 relay FP will become deenergized and relay SP will become energized.

Relay SPA may also become energized if SC1 is to skip phase C (contact JC-3 closed); if phase B is to be displayed by SC1 (upper contacts AR-20 closed, JB-3 closed, TPM-5 closed); if relay SP of sub-controller SC2 (relay SP2) is energized or if SC2 is at rest (contact RRA-1 closed).

In single-entry mode operation sub-controller SC1 will be held in position 10 until its relay SPA becomes energized. Also, in single-entry mode operation relay ADC will become energized during the phase A intervals in position 10 as soon as relay SPA becomes energized.

Referring to bank 6, position 10 is timed by operation of the last car passage timing circuit, block 134, through closed contacts SPA-1, the upper contacts of ADC-3 and contact CS-1.

By operation of relay SPA contact SPA-6 of block 134 is in its upper closed position and the last car passage time circuit is made non-extendible.

Contact SP-1 holds the normal interval timing circuit ineffective. An interval is now timed by the circuit in block 134. The interval now timed may be referred to as the last car passage since sufficient time is now permitted to allow a vehicle or vehicles located between the vehicle detector and the intersection, to clear the intersection before terminating the interval. If during the interval a vehicle crosses the phase A detector this vehicle will cause drop-out of the relay AM, which was energized in position 8. The drop-out circuit now includes the upper closed position of contacts ADC-7 and AD-4.

When the interval timed by block 134 terminates the relay CS is operated and closure of its contact CS-1 completes the charging circuit through wiper 215.

In positions 6 through 10 there is no change in the signal indication.

In position 11 relays SP and SPA become deenergized and in positions 11 and 12 relay ADC remains energized and completes the minimum time or rapid advance circuit through ADC-5 in bank 6.

In position 13 relay YL is energized which closes contact YL-1 to apply a potential for establishing a bias on timing capacitor 196. Also, contact YL-6 in block 134 is closed to hold the timing capacitor 252 shunted so that the timing circuit in block 134 is ineffective.

Relay YL also closes contact YL-5 in FIG. 5c associated with bank 3 to complete a circuit to energize relay ACY and contact YL-3 is opened to drop out relay AOY.

With relay AOY deenergized, contact AOY-2 (FIG. 5h) is closed in its lower position and the outside artery green signal (S2W) is extinguished and the clearance or yellow signal (Y) is illuminated. With relay ACY energized, contact ACY-2 is closed in its upper position and the inside artery green signal is extinguished and the inside yellow (Y) signal is illuminated. The left turn signal (S3W) and the phase B signal (SN) remain red. During the timing of the interval in position 13 actuation of a phase A vehicle detector will cause energization of the phase A detector relay AD and closure of its contact AD-4. With relay AOY deenergized so that its contact AOY-1 is closed, ground is applied to the position side of the AM relay so that if the AM relay is energized it will be dropped out.

At termination of the yellow or clearance interval the wiper of the banks of the stepping switches are advanced into the phase B positions. In position 14 relays AR, AOG, YL, ACY and ADC become deenergized and relays BR and BLR become energized. Relay BR becomes energized through a circuit completed from ground via wiper arm 161 and positions 14 through 20, the lower closed contacts of JB-6, relay BR, contact CR-10 and AR-18. A parallel circuit from the lower contacts of JB-6 through CLR-2 and AOG-3 energizes relay BLR.

Deenergized relay AOG reverses its contact AOG-2 to its lower closed position and the red signal to outside artery traffic is illuminated as the yellow signal is extinguished. With energization of relay BLR contacts BLR-2 and BLR-3 are closed in their up positions so that the red signal is displayed to inside artery traffic (S1W) while the yellow signal is extinguished. The green signal is illuminated to phase B traffic (SN) while the red signal is extinguished.

Position 14 is a skip-step, as seen in FIG. 5a, bank 6 and the wipers are rapidly stepped to position 15, the initial interval of phase B. Operation of the sub-controller through the phase B positions is substantially the same in both modes of operation except that in double-entry mode operation the phase B cannot be skipped.

This is prevented by the presence of contact TPM-15 which is closed only during single-entry mode operation, further during double-entry mode operation the phase C is always skipped and the interval normally timed in position 20 is timed in position 5. This compares with single-entry mode operation when the phase C is skipped, which may occur if one sub-controller distributes right-of-way between phase B and phase A and the other controller is at rest in phase C. In single-entry mode operation the phase B may be skipped if there is no demand for the same by phase B vehicle traffic when the sub-controller is leaving phase A such change being made at the request of the other sub-controller.

In position 15 relay IR becomes energized and closes its contact IR-1 which in combination with contact BR-2 provides a potential through resistor 185 to establish the bias applied to timing capacitor 196 for determining the time of the interval. Contact IR-2 electrically connects the circuitry of block 135 to block 131 so that the time interval established by the potential through resistor 185 may be subject to change by the "added initial" circuitry. However, the added initial circuitry connected to the lower position of contact AR-3, including the BR', BM', BD' and IR' contacts and capacitors 222 and 224 are used in a manner similar to that described above relative to the upper part of the added initial circuitry.

Upon termination of the initial interval advance to position 16 drops-out relay IR and causes energization of relay VI. Contact VI-6 electrically connects the time reduction circuitry of block 133 to block 131 via lead 259. Contact BR-6 and resistor 189 and contact BR-2, in series provide a potential to establish a minimum bias on timing capacitor 196 while the adjustable resistor 266 connected in the circuit by closure of contact BR-12 establish the rate of increase of charge to capacitor 260.

Vehicle actuated reset of timing capacitor 196 is accomplished by phase B traffic through the upper closed contacts of VI-2, BR-3 and BD-1 which may reduce the linear rate charge on the timing capacitor but does not reset the bias applied to the capacitor. The circuitry for timing the vehicle interval of phase B is similar in operation to the circuitry for timing the vehicle interval in phase A except during phase A the controlling contacts are operated by the phase A relays, AR and AD, while during phase B the controlling contacts are operated by the phase B relays BR and BD.

The maximum limit timing circuit block 136 is also timing the maximum time the sub-controller will be permitted to remain in the phase B vehicle interval position. In single-entry mode operation adjustable resistor 191 is used to apply a potential to establish a bias on capacitor 223. In double-entry mode operation adjustable resistor 190 is used for the same purpose. This provides two separate maximum limit time intervals each of which may be set at different times. It should be understood that a similar selection of maximum time intervals may be provided for the phase A maximum limit periods if desirable.

Upon termination of the phase B vehicle interval by operation of the normal interval timing circuit (AS)

or by operation of the maximum limit timing circuit, the linear rate charge on capacitor 196 is washed down and the wipers advance to position 17, a skip position. In position 17 capacitor 260 is discharged by closure of the lower contacts of VI-8. Relay FP closes contact FP-4 and prepares a circuit to energize relay JC. If the sub-controller is operating in double-entry mode contact TPM-16 will be closed and relay JC will become energized. If the sub-controller is operating in single-entry mode relay JC may become energized if the other sub-controller has no demand or calls for phase A or phase B (relay AM2 and BM2 energized). In position 18 relay FP in block 149 is deenergized and relay SP is energized. Relay SPA may become energized if relay JC is energized so that phase C will be skipped or if relay RRA, the repeater relay of RR2 in SC2, located in SC1, is energized indicating that SC2 is at rest, or if the SP relay of SC2 is energized.

If the conditions for energization of relay SPA do not then exist sub-controller SC1 will be held in its position 18 until such conditions are met.

If relay BDC is deenergized when relay SPA is energized the advance from position 18 to position 19 will be accomplished by the rapid charging of capacitor 216 via the lower closed contacts of BDC-2 and SPA-5. If relay BDC is energized advance of the wiper arms will be made as soon as relay CS is operated, at least at the end of the last car passage period as timed by block 134.

In position 19 relays SP and SPA are deenergized and relay CG is energized so long as relay BDC is deenergized. If relay CG remains deenergized contact CG-2 supplies a path for the rapid advance charging power applied to capacitor 216. If relay CG becomes energized, contact CG-2 opens to hold the rapid advance circuit open while contact CG-1 closes to provide a potential to establish a bias for timing capacitor 196 and the interval is timed by operation of the normal interval timing circuit.

With relay CG energized the normal interval timing circuit times the interval but at the same time the last car passage timing circuit block 134 times the last car passage period. During this period the last car passage timing circuit is resettable via actuation of a phase B vehicle detector which energizes relay BD thus completing a shunting circuit across capacitor 252 via contacts BD-3 and BR-7.

If now the interval timed by the normal interval timer is terminated before the resettable timing circuit of block 134 can time out, the phase B memory relay BM is deenergized by closure of the circuit through the lower closed contacts BDC-5, BR-9, CG-4, AS-3 and CS-3. This will assume that a vehicle is between a phase B vehicle detector and the intersection and will act to recall right-of-way to phase B.

Position 20 provides for the energization of relay YL and deenergization of relay CG. Relay YL will close its upper contacts YL-7 so as to extinguish the green signal of the phase B signals and illuminate the yellow (Y) or clearance signal to phase B traffic. Contact YL-1 also closes to provide a potential through contact BR-2 and adjustable resistor 187 to establish a bias for setting the time period timed by the normal interval timer.

If phase C is not to be skipped, i.e. the JC relay is held deenergized, the clearance interval for phase B is timed in the position 20, as described above but if the phase C is to be skipped or the sub-controller is operating in double-entry mode then the relay JC is energized in position 17 and the BDC relay is energized in position 18. Position 18 is terminated through a timed period which ends with the energization of relay CS. In position 19 relay CG is held deenergized by open contact BDC-1 and positions 19 and 20 become skip steps along with positions 1 through 3 by closure of contact JC-2 of bank 1. Position 4 becomes a skip step through closed contact CG-3 of bank 6 and the clearance interval of phase B is timed in position 5.

OPERATION OF SUB-CONTROLLERS IN DOUBLE-ENTRY MODE

As previously stated the phase C positions, 1 through 5 are always skipped in double-entry mode operation. This is indicated by the energizing circuit for the JC relay which is completed through JB-6 down, FP-4 closed and TPM-16 closed. Relay JC pulls-in to close a holding circuit including JC-8 and JB-6.

With JC relay energized relay SPA is always energized in position 18. With JC relay and SPA relay energized and relay TPM deenergized in position 18, relay BDC is pulled-in. This combination of energized relays in single-entry mode provides a skip step in position 18, as described but in double-entry mode operation (relay TPM energized), provides a last car passage timed interval in position 18 and provides for position 19 to become a skip step.

In double-entry mode operation relays JA and JB may not be energized due to open contact TPM-15 but relay JC is energized during the transfer operation of right-of-way from phase B to phase A.

Relay JC closes its upper contacts of JC-7 to provide a ground for relay BR and JC in positions 1 through 5 and upon advance of the wipers to position 6 relay AR becomes energized while relays BR and JC become deenergized.

In positions 6 through 11 relay AOG is held energized through contact TPM-17 and wiper arm of bank 3. Relay AOY is also energized through TPM-17 in series with OY-2 and YL-3. Thus the green signal to artery outside traffic (S2W) is illuminated. Relay CLR is energized through the upper closed contacts of TPM-18 and the lower closed contacts BR-8. This provides for illumination of the green signal (G) to left turn artery traffic via contacts CLR-1 up, CY-2 down and TPM-14 up (S3W). Relay BLR and relay ACY are both deenergized so that the green signal is illuminated to inside artery traffic (S1W) while the red signal is shown to phase B traffic (SN).

Positions 6, 7 and 8 are timed as previously described except that in position 8 termination of the extendible vehicle interval reduces the bias on the capacitor 196 but does not result in discharge of the linear rate charge on capacitor 196 because of open contact TPM-3.

It should be noted that, as previously described relative to single-entry mode operation, in order that SC1 start its timing of the vehicle interval the sub-controller must be released through its "Yield" circuit. In double-entry mode since relay TPM is energized and contact TPM-9 is open SC1 must have a call to go to phase B so that BM-3 will open and drop relay RR thereby closing contact RR-4.

Contact AR-21 is closed but contact TPM-10 is open so that SC1 may "Yield" only if SC2 is in its phase A (contact AR2-10 closed) or if SC2 is in phase B and at reset (BR2-5 and RRA-5 closed).

When the vehicle interval of position 8 terminates the linear rate charge is held on capacitor 196 and the bias is reduced while the wiper arms are advanced to position 9. Position 9, which is a minimum time step in single-entry mode becomes a timed position with the time of the interval established by the amount of reduction bias that had been applied to the timing capacitor at the time of termination of the vehicle interval. Thus position 9 is timed as a last car passage interval by the normal interval timer, block 131.

In position 10 relay SP in SC1 becomes energized and holds the normal interval timing circuit of block 131 inoperative. Sub-controller SC1 holds in position 10 until its relay SPA become energized. If relay SPA of SC1 becomes energized via contact SP2-3 in SC2 then relay ADC will remain deenergized and position 10 will become a minimum time step position through contact SPA–1 and contact TPM–21. In position 11, with relay ADC deenergized, relay OY is pulled-in which closes its contact OY–1 and times outside clearance interval via the normal interval timing circuit and also opens its contact OY–2 associated with bank 3 which causes relay AOY to drop while relay AOG is held energized. This relay combination results in a yellow signal being displayed to outside artery traffic while green signals are held to inside artery traffic and left turn artery traffic with a red signal to phase B traffic.

At termination of the outside clearance interval the wipers advance to position 12 and relay OY becomes deenergized and relay CG becomes energized. Relay AOG, associated with bank 3 becomes deenergized and contact AOG–2 closes in its lower position extinguishing the yellow outside clearance signal and illuminating a red signal to outside artery traffic. Relay CG closes its contact CG–1 and times the green clearance or delayed green period while the green signals are displayed to inside artery traffic and to left turn artery traffic.

In double-entry mode operation, both sub-controllers in phase A and both going to phase B, both sub-controllers will be in substantially the same position and show similar signals to corresponding traffic flows, both sub-controllers moving into position 11 at substantially the same time. This becomes evident by the relay SPA1 of SC1 being controlled by relay SP2 of SC2 and the relay SPA2 of SC2 being controlled by relay SP1 of SC1 as shown more clearly in FIG. 6b.

If, position 10 relay SPA becomes energized via closure of relay contacts RRA–1 or via contact SP2–2 when SC2 is in phase B then relay ADC becomes energized through a circuit closed by RRA–2 or BR2–15 respectively. Relay ADC locks in through its contact ADC–4 and AR–7.

Relay SPA closes its contact SPA–1 of bank 6 and completes a circuit through TPM–21 to provide a minimum time step circuit.

In position 11 relays SP and SPA become deenergized while relay ADC holds energized. Relay OY is held deenergized by open contact ADC–2. Contact ADC–5 is closed and provides a minimum time stepping circuit for advance of the wipers to position 12.

In position 12 relay ADC is maintained energized and through open contact ADC–1 hold relay CG deenergized while the minimum time stepping circuit is maintained through contact ADC–5.

In positions 11 and 12 with relay ADC energized contact ADC–8 associated with bank 3 is closed and, through upper contacts of TPM–17 relay AOG is maintained energized. Relay AOY is also held energized through contact OY–2, and YL–3 the contact TPM–19 being open. With relays AOG and AOY energized green signals are maintained to the three artery traffic flows.

In position 13 relay YL is energized and closes its contact YL–1 in block 131 and times the yellow clearance interval for artery traffic. Relay YL opens its contact YL–3 to drop-out relay AOY and closes its contract YL–5 which pulls-in relay ACY through AR–16, JB, YL–5, and BR–8 and pulls-in relay CY through upper contacts TPM–13, AR–16, JB–5, YL–5 and BR–8.

Relay contact AOY–2 drops to extinguish the green signal display to outside artery traffic and illuminated a yellow clearance signal. Relay contact CY–2 pulls-up to extinguish the green signal illuminated through the upper contacts of TPM–14 and illuminates the yellow clearance signal to left turn artery traffic. Relay contact ACY–2 is pulled-up and extinguishes the green signal to inside artery traffic and illuminates the yellow clearance signal to inside artery traffic.

The advance of the wipers at the end of the yellow clearance interval terminates the yellow clearance signal of phase A and in position 14 the phase A indicating relay, AR is dropped and the phase B indicating relay BR is pulled-in.

Thus in double-entry mode operation in position 10 the decision is made whether or not to show a delay or lagging green period and this decision depends upon the position of the other controller.

The phase B positions of double-entry mode operations are timed in a manner similar to that described below except that in the interval timed in position 18 is timed as a last car passage circuit in block 134 through closed contact SPA–5, the upper contact TPM–7 and contact CS–1 which is closed by operation of the last car passage timing circuit.

The manually operated switch SWS in FIG. 5c energizes relay ST upon closure. When energized relay ST closes its contacts ST–2, ST–3 and ST–4 in blocks 136, 134 and 131 respectively to keep the respective timing circuits from operating. Contact ST–1 in block 149, opens to keep relay IR from becoming energized if the relay would otherwise energize. The switches RSWA and RSWB in block 139 in FIG. 5b represent recall switches which, when closed serve to automatically register a demand for return of right-of-way to the phase from which right-of-way is being withdrawn.

Switch SWM associated with the motor magnet MM represents a manually operated switch for rotating the wipers of the stepping switch manually as described.

FIG. 5b illustrates a line switch bank 4 with connections to positions 5, 11, 12, 13 and 20. The contacts associated with the positions are controlled by the relays included in the contact designations, which are primed.

In position 5 circuit to ground may be obtained from terminal 271 when relay YL is energized. This may be used for other signal combinations such as a B plus C overlap yellow clearance. In position 11 with relay OY energized; in position 12 with relay CG energized and in position 13 with relay YL energized a circuit to ground may be obtained from terminal 272 which may be used for other signal combinations such as the phase C plus phase A overlap yellow clearance. In position 20, with relay YL energized a circuit to ground may be obtained from terminal 273 for the signal combinations of phase A plus phase B overlap yellow clearance.

It should be understood that the timing and trigger circuits combined in block 131, 134 and 136, for example, illustrate the preferred form of timing circuits, however, other types of timing circuits may be used in lieu thereof if desired.

It should also be understood that all contact positions are illustrated in their normal condition as if the relay controlling the contact were deenergized and as if the controlling relay were positioned to operate the contact form the above respective contact.

INTERLINKING CIRCUIT OF FIGS. 6a AND 6b

Referring brifly to FIGS. 6a and 6b the intersection shown in plan view in FIG. 1 is represented at the top of FIG. 6a with identical labels for duplicated components. The leads 31, 32, 34 and 35 are shown in FIG. 1 and are also illustrated in FIG. 4 as following into the mode switching assembly where the circuit of the mode switching assembly is illustrated. Leads 28 and 108 follow from the detector DN and the mode switching assembly to the phase B detector relay BD1 in SC1 and are represented in FIG. 5b while the leads 30, 118 and 117 follow from the detector D2W and the mode switching assmbly with lead 244 following from the sub-controller SC2, all to the detector relay AD1 in SC1 with the leads also represented in FIG. 5b.

The broken line SC1 represents part of sub-controller SC1 and broken line SC2 represents part of sub-controller SC2, each following to FIG. 6b due to the numerous interconnections between the sub-controllers.

The leads extending from the mode switching assembly, such as 118, 117, 108, 113, 110, 120, 122, 125, 124 and 123 between MSA and SC1 and 109, 114, 115, 116, 112, 121, 127, 126, 129 and 128 between MSA and SC2 are also illustrated in FIG. 4 and the circuitry between the mode switching assembly and the individual sub-controller may be seen by cross reference to the figures.

The relays AD1 and BD1 of SC1 and AD2 and BD2 of SC2 serve as detector relays which are energized upon closure of a normally open switch in a vehicle detector.

Relay TPM1 in SC1 and TPM2 of SC2 are the mode determining relays of the respective sub-controller and are controlled by the mode switching assembly as previously described.

The complete circuitry associated with lead 122 is shown more completely in FIG. 5b where relay CH1 is shown with the energizing circuitry of the relay including contacts from relay AM and BM (AM1 and BM1 of SC1). The corresponding symmetrical circuitry in SC2 includes lead 127 and contacts AM2-2 and BM2-2.

Lead 125 from MSA to SC1 terminating at terminal 263, is also shown in FIG. 5b the corresponding symmetrical circuitry in SC2 being 126 to junction 263'. Relay DC1 in MSA is thus energized when power is applied to junction 263 of SC1 and relay DC2 in MSA is energized when power is applied to the corresponding junction in SC2, 263'.

Relay CO1 of SC1 and CO2 of SC2 are the coordination control relays of the respective sub-controllers which release the respective controller upon drop-out. Drop-out of the coordination relay, which is also referred to as yielding or "yield," is provided through the relation of one sub-controller to the other thus providing mutual coordination between the sub-controllers. Symmetrical interconnected yield circuitry is illustrated between the two sub-controllers, although FIG. 5b shows the complete circuitry of one sub-controller.

In FIG. 6b the relay RRA2, the repeater relay of RR1 in SC1 is shown in SC2 controlled by contact RR1-1 in SC1. This transposition of the rest relay (RR) by a repeater relay reduces the number of interconnect circuits between the two controllers since the RR relay (FIG. 5b) of one sub-controller controls several contacts in the other sub-controller. Relay RRA1 in SC1 is controlled via relay contact RR2-1 in SC2.

Part of the controlling circuitry for relay HR (HR1 in SC1 and HR2 in SC2) is illustrated interconnected between the sub-controllers in symmetrical circuitry. As previously described the relay HR (in FIG. 5b) provides a means by which the maximum limit timing circuit and the reduction timing circuit may be temporarily held inoperative under certain conditions previously described.

The relay BDC1 of SC1 and relay BDC2 of SC2 (BDC of FIG. 5c) may each be partly controlled by interconnected circuitry between the sub-controllers. Upon pull-in, the phase B delayed clearance will be omitted from the current cycle of respective sub-controller. Relays CDC1 and CDC2 (CDC of FIG. 5c) which also have certain of their respective circuitry interconnected as shown, are also energized to omit the special clearance interval in the current cycle of phase C of the respective sub-controller.

Relays JC1 and JC2 are the skip relays of phase C in SC1 and SC2 respectively. When the JC relay (JC1 in SC1 and JC2 in SC2) is energized, the phase C of the current cycle will be omitted. Conditions of omission of the JC relay of either sub-controller depend upon the action of the other sub-controller. This has the effect of making the phase C of one sub-controller an actuated phase, responsive to the other sub-controller.

Relay SPA1 of SC1 and SPA2 of SC2 (SPA of FIG. 5c) each are the second of a pair of relays of each sub-controller which may be operated in a second of two consecutive preparatory positions in each phase. Mutual coordination between the sub-controllers is provided in certain preparatory positions by reciprocal control of the relay SPA of one sub-controller by the other sub-controller. In position 3 of bank 6 a timing circuit of one-controller is controlled via the SP relay of the other sub-controller so that mutual coordination between the sub-controllers is maintained in the phase C positions.

MODE SELECTION IN RESPONSE TO TRAFFIC ACTUATION—FIG. 7

FIG. 7 represents one means in which mode selection may be made in response to traffic actuation.

The leads 106 and 107 of FIG. 7 would be connected to the leads 106 and 107 in FIG. 4 and the switches 104 and 105 in FIG. 4 would be opened or eliminated so that the only ground source would be through lead 106 or 107 individually.

VD1 and VD2 each represent vehicle detectors, each of which may be located in different traffic flows so as to be actuated by vehicles in different traffic flows. Thus two samplings of traffic may be provided.

Traffic Measuring Device 1 may be similar to Traffic Measuring Device 2 and each may be a device to measure some characteristic of traffic. Each may include a means for energizing the relay TD1 and TD2 respectively at a predetermined traffic level or value. In the preferred form, when the value or level of traffic as measured by device 1 arrives at and exceeds a predetermined value relay TD1 would become energized. Below such value of the relay would be deenergized. It may be desired to provide that the relay TD1 may become energized at some critical traffic level but when once energized, the traffic level must fall somewhat below the critical level for the relay to become deenergized.

Traffic Measuring Device 2 and its associated relay TD2 may operate similar to Traffic Measuring Device 1 and its associated relay TD2.

Switch SW10 is provided to permit selection between two circuit networks each of which provides an input (a ground connection) through lead 106 or lead 107 according to the condition of the relays TD1 and TD2. The upper circuit provides that there will be a ground applied to lead 106 so long as one of the relays TD1 or TD2 is deenergized. This indicates that only one traffic measurement is above the predetermined value set in the respective measuring devices. Ground applied to lead 106 calls for double-entry mode operation. Upon energization of both relays, indicating that both traffic measurements are above the predetermined value, ground will be applied to lead 107 which will call for single-entry mode operation.

With both relays deenergized as illustrated, a circuit to apply ground to lead 106 is completed through contacts 281 and 282 and terminal 283 of switch SW10.

With only one relay energized, ground follows through contact 282 to lead 106 or through contacts 284 and 281 to lead 106. With both relays energized, ground is applied to lead 107 via contacts 285, 284 and terminal 283.

With switch SW10 connected to terminal 286 ground is applied through the lower circuit network and in this network energization of only one of the relays is required to apply ground to lead 107. When both relays are deenergized, ground is applied to lead 106 via contacts 287, 288 and terminal 286.

With only one relay energized, ground will be applied to lead 107 via contact 289 or via contacts 287 and 291 and with both relays energized via contact 289.

It may be desired to make mode selection through the use of only one traffic measuring device such as Traffic Measuring Device 1, for example, and eliminate the the other traffic measuring device. This may be accomplished by using the lower circuitry, that is with switch SW10 in its lower position (terminal 286).

Also it may be desired to provide operation of a relay, such as TD1, for example by comparing two traffic measurements. This may be accomplished in a manner similar to that described in U.S. Patent 2,542,978 issued Feb. 27, 1951 to John L. Barker under the title Traffic Actuated Control Apparatus, which provides a desired output in accordance with a comparison made of two measured values, such as traffic volumes for example. Such mode selection apparatus may, for example provide an input to line 106 or line 107 depending on the amount of the difference between the two measured values or depending on the amount and direction of such difference.

OPTIONAL INTERCONNECTION BETWEEN SUB-CONTROLLERS FOR SELECTION OF ALTERNATE ADJUSTABLE RESISTORS FOR INITIAL INTERVAL TIMING—FIG. 8

FIG. 8 illustrates optional interconnected circuitry between the two sub-controllers that may be used to provide selection of one or the other of alternate adjustable resistors for selection of a different basic time period for the initial interval for phase A. Such optional circuitry may be provided for selection of basic time periods for the initial interval of phase B, if desired.

Block SC1 represents sub-controller SC1 and block SC2 represents sub-controller SC2. The energizing circuit for relay AI2 in SC2 includes normally open contact ARI-11, normally closed contacts IR1-10 and RR1-10, the contact located and controlled by relays in SC1. This circuit is closed when sub-controller SC1 is in its phase A position, not at rest will be used to apply a potential via contact IR2-1 so as to establish the bias for the timing capacitor. Thus selection of, for example, a longer initial interval for phase A of SC2 is made according to the position of SC1.

The circuits shown are symmetrical so that identical circuits and a selection of adjustable resistors is found in each sub-controller. Such circuitry in each sub-controller may be useful for providing a longer initial interval, without the aid of the "added initial circuitry" in the phase A of one sub-controller when the other sub-controller is at least timing its phase A vehicle interval.

The switch SW11 in SC1 and SW21 in SC2 is provided so that the increased initial interval may be provided in one sub-controller if the other sub-controller is at rest in its phase A.

FURTHER ALTERNATE FEATURES

Although the specification above describes selection between two modes of operation, it will be obvious that selection of a mode from among more than two modes may be made by adding additional cam positions on the cam mechanism of the mode switching assembly thus providing for more selectable modes of operation and substituting the mode determining relay, in each sub-controller, with a multi-position stepping switch which may arrange the sub-controller into one mode of multiple modes of operation.

Although a number of alternate forms or arrangements of apparatus according to the invention have been pointed out above, it will be obvious to those skilled in the art that other modifications of the apparatus or of the arrangement or character of its parts may be made without departing from the spirit of the invention within the scope of the objects and claims.

I claim:

1. A traffic control system for two closely spaced intersections of first and second roads respectively individual to the respective intersections with a third road common to the two intersections, the first and second roads having respective approaches for traffic to the respective intersections and the common road having inside approaches to the respective intersections from the part of the common road between said intersections and having outside approaches to the respective intersections from said common road outside said part, said system including first and second traffic actuated traffic signal sub-controller means individual to the first and second intersections respectively and each having a cycle of operation having first and second primary phases and a third secondary phase for according right-of-way to the approaches of the roads at the intersections with which the sub-controller means is associated in response to traffic actuation from the respective approaches, mode selecting means, including switching means common to the two sub-controller means for selecting between two desired modes of operation for both sub-controller means, and mode control means individual to the respective sub-controller means for responding to the selection of mode by the common selecting means and to the individual sub-controller means being in a desired part of its cycle to change the mode of operation of said individual sub-controller means to the selected mode, said mode control means having a first or double-entry mode for controlling said sub-controller means to so accord right-of-way to said common road for both traffic directions thereon concurrently in said first phase at each intersection in response to traffic actuation on said common road at the respective intersections and permitting varying degrees of time-overlap of such accord of right-of-way to the common road at both said two intersections and varying degrees of time-overlap of accord of right-of-way to said first and second roads dependent on traffic actuation on the respective last named roads, and including means for assuring a minimum period of concurrent accord of right-of-way to said common road at both said intersections on each transfer of accord of right-of-way from either of said first and second roads to the said common road, and means for omitting said third phase between said second and said first phases in said controller cycle, and means for continuing accord of right-of-way at each intersection to the inside approaches of the common road between the intersections and terminating accord of right-of-way to the approaches of the main road outside of the intersections for a time period before substantially concurrent accord of right-of-way to both said first and second roads in response to traffic actuation in both said first and second roads, and said control means having a second or single-entry mode for controlling said sub-controller means to so accord right-of-way to said outside approaches of said common road at the respective intersections at separate times in the first phases of the respective sub-controller means to prevent overlap of such last-mentioned accord of right-of-way and for so according right-of-way to the respective first and second roads at separate times in the second phases of the respective sub-controller means to prevent overlap thereof and for so according right-of-way in said respective third phases to traffic turning from the respective inside approaches across the path of traffic from the opposing outside approach of said common road in said respective sub-controller means, and including means for causing such accord of right-of-way to one said third phase alone in one sub-controller means when the other said sub-controller means is according right-of-way to either of its first and second phases, and means for causing overlapping such accord of right-of-way in the respective said third phases of both sub-controller means in transition from accord of right-of-way in either of said first and second phases in one sub-controller means to accord of right-of-way to a corresponding phase in the other sub-controller means in response to actuation.

2. A traffic actuated traffic signal control system including two traffic actuated sub-controller means each having right-of-way control signal circuits and each having a control cycle including three phases for operating said signal circuits to accord right-of-way to different traffic flows respectively in selective sequence in response to traffic actuation in the respective traffic flows, said sub-controller means being substantially alike and having substantially corresponding first phases, substantially corresponding second phases and substantially corresponding third phases, and mode selecting means for selectivity controlling said sub-controller means to operate alternatively in a first double-entry mode or a second single-entry mode respectively, said mode selecting means including switching means selectively operable between two switch conditions for providing first and second outputs for selection of said first and second respective modes, means operated by selection of said first mode by said switching means for controlling said sub-controller means to provide selective operation of the respective said sub-controller means in one or another of alternate forms of said control cycle, said means for operating said sub-controller means including means interlinking said sub-controller means for operating either one of said sub-controller means individually from the first phase to the second phase in said one form of said control cycle in response to traffic actuation on the second phase of said one sub-controller means in absence of traffic actuation on the second phase of the other said sub-controller means and other means interlinking said sub-controller means for operating both said sub-controller means from the respective first phases substantially concurrently to the respective second phases through the intervening respective third phases in said other form of said control cycle in response to traffic actuation on both of the second phases of both of said sub-controller means, means operated by selection of said second mode by said switching means for operating said sub-controller means in a third form of said control cycle for according right-of-way to corresponding first phases separately in time and for according right-of-way to corresponding second phases separately in time in response to traffic actuation on the first phases or on the second phases respectively in the respective sub-controller means, said last-named operating means including further means interlinking said sub-controller means for holding either one sub-controller means according right-of-way in its third phase while the other sub-controller means accords right-of-way to either of its first and second phases in absence of traffic actuation on either the first phase or the second phase of said one sub-controller means, and means interlinking said sub-controller means for operating said other sub-controller means to accord right-of-way next to its third phase when said other sub-controller means is according right-of-way to its first phase or its second phase and there is traffic actuation for the first phase or the second phase of said one sub-controller means, said one sub-controller means thereby being operated to accord right-of-way next to its first phase or second phase respectively, and means interlinking said sub-controller means for operating said sub-controller means for according right-of-way concurrently to said third phases for a time period in transition from accord of right-of-way to said first phase of either one sub-controller means to accord right-of-way to either said first phase or said second phase of the other sub-controller means, and means interlinking said sub-controller means for operating said sub-controller means for according right-of-way concurrently to said third phases for a time period in transition from accord of right-of-way to said second phase of either one sub-controller means directly to said second phase in said other sub-controller means.

3. A traffic control system as in claim 2 and said mode selecting means including means for controlling said mode selection in response to traffic actuation.

4. A traffic control system as in claim 2 and said mode selecting means including means actuated by traffic for measuring a characteristic of traffic flow over a range of values, said measuring means providing an electrical output signal having a corresponding range of values representing said characteristic of traffic flow, and means for controlling said selection of mode in response to the value of said electrical signal for said measured characteristic attaining a predetermined relation to a presettable electrical signal value within said range.

5. A traffic control system as in claim 2 and in which said sub-controller means include circuit means actuated by traffic at the respective intersections for such control of accord of right-of-way, and said system including means controlled by actuation of said circuit means for measuring a characteristic of traffic flow to provide an electrical output signal varying over a range of values to represent said measured characteristic, and means for controlling said selection of mode by said mode selecting means in response to said electrical output signal in accordance with said measured characteristic.

6. A traffic control system as in claim 2 and including means actuated by traffic for measuring traffic individually in first and second traffic paths to provide first and second electrical outputs for the traffic measurements of the respective paths and said outputs having an electrical signal level variable above and below individually adjustably preset values for the respective traffic measurements, and means for controlling said mode selection by said mode selecting means to select the second said mode in response to either of said outputs being substantially above their respective preset values and means for controlling said mode selection by said mode selecting means to select the first said mode in response to both of said outputs being substantially below their respective values.

7. A traffic control system as in claim 6 and including alternate means for controlling said mode selection by said mode selecting means to select said second mode in response to both of said outputs being substantially above their respective preset values and to select said first mode in response to either of said outputs being substantially below their respective preset values, and means for selectively making said alternate controlling means or said last previously mentioned controlling means effective for so controlling said mode selection by said mode selecting means.

8. A traffic control system as in claim 2 and in which said sub-controller means each include means for according right-of-way to said common road in corresponding phases in the respective sub-controller means, means for so extending right-of-way for a short increment of time from individual traffic actuations spaced less than said time increment during at least a part of said period of accord of right-of-way to one said corresponding phase, means for reducing said increment of time progressively over a longer period of time in response to traffic actuation on another of said phases during said accord of right-of-way in said one phase, and said interlinking means including means for controlling said increment reducing means in each sub-controller means to start said progressive reducing action in response to the first such traffic actuation on said other phase in said other sub-controller means when both controller means are in said part of said corresponding phases for according right-of-way to said common road.

9. A traffic control system as in claim 2 and in which each said sub-controller means includes means for according right-of-way to said common road in corresponding phases in the respective sub-controller means and for so extending right-of-way in a part of said period of accord of right-of-way to said corresponding phases, maximum timing means for providing a maximum time limit to such extension of right-of-way on one phase from traffic actuation on another of said phases, and said interlinking means including means for controlling said maximum timing means in each sub-controller means to start and continue timing said maximum time limit in one sub-controller means in response to the first such traffic actuation on said other phase in said other sub-controller means when both sub-controller means are in said part of said corresponding phases for according right-of-way to said common road, and means for controlling said maximum timing means in said one sub-controller means for terminating extension at said time limit on one phase of right-of-way in response to traffic actuation on said other phase in said one sub-controller means, said maximum timing means continuing to time to said time limit without so terminating said extension at said time limit in absence of traffic actuation on said other phase of said one sub-controller means.

10. A traffic control system as in claim 2 and in which said interlinking means includes relay means in the respective sub-controller means, said relay means having one operating condition for so providing one of said modes and having another operating condition for so providing another said mode in response to said selecting means, and said selecting means including a further multi-position cyclic switching means having a cycle including certain of the last named said positions for operating said relay means from said one condition to the other condition and including certain other of said last named positions for operating said relay means to said one condition, and means cooperating with said sub-controller operating means in the respective sub-controller means and with said further multi-position cyclic switching means for controlling said relay means in the respective sub-controller means for so changing from one condition to the other in relation to a particular accord of right-of-way in the respective sub-controller means.

11. A traffic control system as in claim 2 and in which said sub-controller means each include means for according right-of-way to said common road in corresponding phases in the respective sub-controller means, means for so extending right-of-way for a short increment of time from individual traffic actuations spaced less than said time increment during at least a part of said period of accord of right-of-way to one said corresponding phase, means for reducing said increment of time progressively over a longer period of time from traffic actuation on another of said phases during said accord of right-of-way in said one phase, and means for timing a further period longer than said reduced time increment and reset from each traffic actuation during at least a part of said accord of right-of-way to said one corresponding phase including a part of said last-mentioned accord of right-of-way in which said sub-controller means may be held from terminating right-of-way temporarily by action of the other sub-controller means, and means for storing a simulated traffic actuation on said one corresponding phase whenever accord of right-of-way is terminated on the last named phase before said timing of said further period is completed, and said interlinking means including means for so holding said one sub-controller means so according right-of-way to said one corresponding phase for a short time period before such termination when said other sub-controller means is preparing to terminate the accord of right-of-way to the corresponding phase of said other sub-controller means.

References Cited by the Examiner

UNITED STATES PATENTS

| 2,145,031 | 1/1939 | Renshaw | 340—35 |
| 2,156,138 | 4/1939 | Wilcox | 340—35 |
| 2,883,644 | 4/1959 | Barker | 340—36 |

FOREIGN PATENTS

| 472,832 | 9/1937. | Great Britain. |
| 488,796 | 7/1938 | Great Britain. |
| 535,709 | 4/1941 | Great Britain. |

NEIL C. READ, *Primary Examiner.*

THOMAS B. HABECKER, *Examiner.*